United States Patent
Fischer et al.

(10) Patent No.: US 10,039,412 B2
(45) Date of Patent: Aug. 7, 2018

(54) BREWING APPARATUS FOR EXTRACTING A PORTION CAPSULE

(71) Applicant: EUGSTER/FRISMAG AG, Amriswil (CH)

(72) Inventors: Daniel Fischer, Romanshorn (CH); Christof Seger, Kesswill (CH); Marcel W. Hueppi, Rorschacherberg (CH)

(73) Assignee: Eugster/Frismag AG, Amriswil (CH)

( * ) Notice: Subject to any disclaimer, the term of this patent is extended or adjusted under 35 U.S.C. 154(b) by 249 days.

(21) Appl. No.: 14/723,032

(22) Filed: May 27, 2015

(65) Prior Publication Data
US 2015/0257583 A1    Sep. 17, 2015

Related U.S. Application Data

(60) Division of application No. 13/687,045, filed on Nov. 28, 2012, which is a continuation of application No. PCT/EP2011/000271, filed on Jan. 24, 2011.

(30) Foreign Application Priority Data

May 28, 2010 (DE) .......... 10 2010 021 849
Sep. 10, 2010 (DE) .......... 10 2010 044 945

(51) Int. Cl.
*A47J 31/40* (2006.01)
*A47J 31/44* (2006.01)
*A47J 31/36* (2006.01)

(52) U.S. Cl.
CPC ......... *A47J 31/407* (2013.01); *A47J 31/3628* (2013.01); *A47J 31/3633* (2013.01); *A47J 31/4403* (2013.01)

(58) Field of Classification Search
CPC .. A47J 31/3628; A47J 31/3633; A47J 31/407; A47J 31/4403
(Continued)

(56) References Cited

U.S. PATENT DOCUMENTS

| | | |
|---|---|---|
| 3,800,690 A | 4/1974 | Molenaar et al. |
| 4,158,329 A | 6/1979 | McKnight |

(Continued)

FOREIGN PATENT DOCUMENTS

| | | |
|---|---|---|
| CN | 1781420 A | 6/2006 |
| CN | 101500458 A | 8/2009 |

(Continued)

*Primary Examiner* — Dana Ross
*Assistant Examiner* — Kuangyue Chen
(74) *Attorney, Agent, or Firm* — The Dobrusin Law Firm P.C.

(57) ABSTRACT

A brewing apparatus for extracting a portion capsule includes a first brewing chamber element and a second brewing chamber element, wherein the first and/or the second brewing chamber element are/is movable in an axial direction between a loading position, in which the first and the second brewing chamber elements are spaced apart from each other, and an extraction position, in which the first and the second brewing chamber elements form a substantially closed brewing chamber and wherein the first brewing chamber element has at least one first perforation means for perforating the portion capsule, said perforation means being arranged along the Earth's gravitational field below a horizontal plane extending substantially at a right angle to the gravitational field and centrally through the brewing chamber.

8 Claims, 13 Drawing Sheets

(58) Field of Classification Search
USPC .......................................... 426/425; 99/295
See application file for complete search history.

(56) References Cited

U.S. PATENT DOCUMENTS

| | | | |
|---|---|---|---|
| 4,581,239 A | 4/1986 | Woolman et al. | |
| 4,911,067 A * | 3/1990 | Oppermann | A47J 31/0615 99/295 |
| 5,421,219 A | 6/1995 | Tagawa et al. | |
| 6,026,732 A | 2/2000 | Kollep et al. | |
| 6,418,779 B1 * | 7/2002 | Huang | G01N 27/4077 73/23.2 |
| 6,584,888 B2 | 7/2003 | Cortese | |
| 6,792,980 B1 | 9/2004 | Cortese | |
| 7,531,198 B2 | 5/2009 | Cortese | |
| 9,215,947 B2 * | 12/2015 | Sonderegger | A47J 31/3623 |
| 2003/0070554 A1 * | 4/2003 | Cortese | A47J 31/3628 99/279 |
| 2006/0107841 A1 | 5/2006 | Schifferle | |
| 2006/0174769 A1 | 8/2006 | Favre et al. | |
| 2010/0064899 A1 * | 3/2010 | Aardenburg | A47J 31/3633 99/295 |
| 2010/0101428 A1 | 4/2010 | Fin | |
| 2011/0217421 A1 | 9/2011 | Perentes et al. | |
| 2012/0058226 A1 | 3/2012 | Winkler et al. | |
| 2012/0272830 A1 | 11/2012 | Gugerli | |
| 2013/0084363 A1 | 4/2013 | Krüger et al. | |
| 2014/0026761 A1 | 1/2014 | Bartoli et al. | |
| 2014/0079853 A1 | 3/2014 | Hansen | |

FOREIGN PATENT DOCUMENTS

| | | |
|---|---|---|
| DE | 600 02 820 T2 | 12/2003 |
| DE | 102004056317 A1 | 5/2006 |
| EP | 0 891 734 A1 | 1/1999 |
| EP | 1 219 217 A1 | 7/2002 |
| EP | 1 295 554 A1 | 3/2003 |
| EP | 1 369 069 A2 | 12/2003 |
| EP | 1500357 A1 | 1/2005 |
| EP | 1529469 A1 | 5/2005 |
| EP | 1774878 A1 | 4/2007 |
| EP | 2077087 A1 | 7/2009 |
| EP | 2177136 A1 | 4/2010 |
| GB | 1215840 A | 12/1970 |
| JP | 2013-514102 A | 4/2006 |
| JP | 2006-142015 A | 6/2006 |
| JP | 2009511143 A | 3/2009 |
| JP | 2010501230 A | 1/2010 |
| NL | 8302168 A | 1/1985 |
| WO | 2006/005736 A2 | 1/2006 |
| WO | 2007042415 A1 | 4/2007 |
| WO | 2008023057 A2 | 2/2008 |
| WO | 2008107281 A2 | 9/2008 |
| WO | 2010/026045 A1 | 3/2010 |
| WO | 2011/147591 A1 | 12/2011 |
| WO | 2012/031106 A1 | 3/2012 |
| WO | 2012/160342 A1 | 11/2012 |

\* cited by examiner

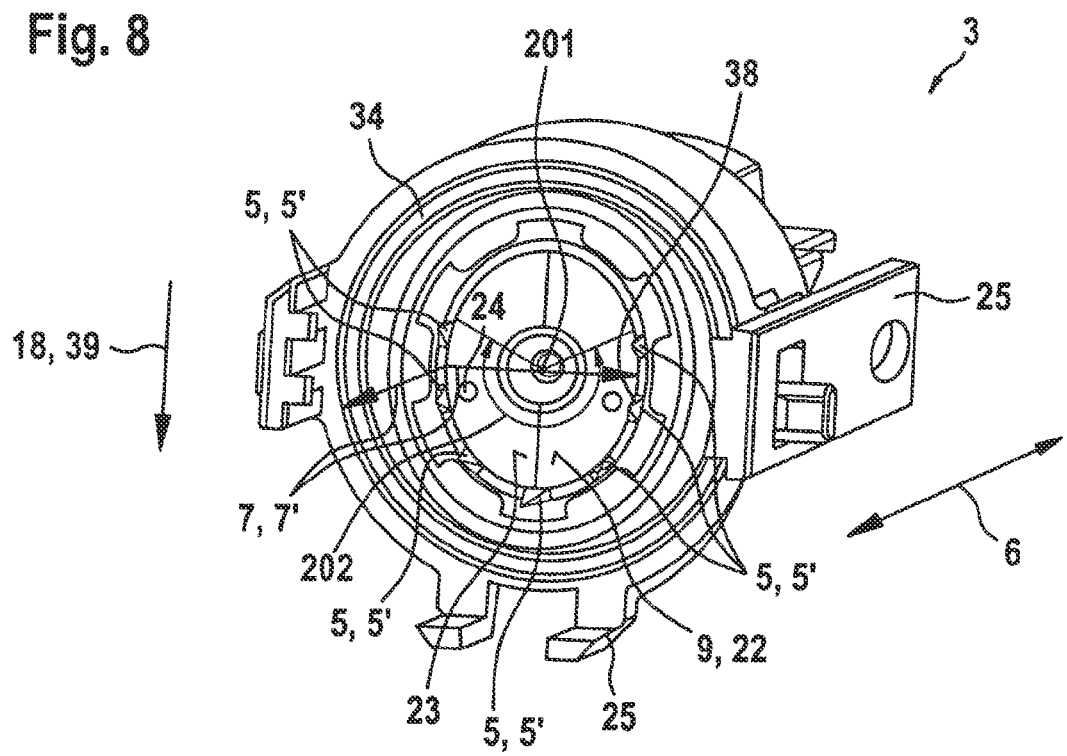

BREWING APPARATUS FOR EXTRACTING A PORTION CAPSULE

CROSS REFERENCE TO RELATED APPLICATIONS

This application is a Division of Nonprovisional application Ser. No. 13/687,045, filed on Nov. 28, 2012, entitled "BREWING APPARATUS FOR EXTRACTING A PORTION CAPSULE", which is a Continuation of International Application No. PCT/EP2011/000271, filed on Jan. 24, 2011, entitled BREWING APPARATUS FOR EXTRACTING A PORTION CAPSULE, which applications are both hereby incorporated by reference in their entirety.

BACKGROUND

The present invention relates to a brewing apparatus for extracting a portion capsule, comprising a first brewing chamber element and a second brewing chamber element, wherein the first and/or the second brewing chamber element are/is movable in an axial direction between a loading position, in which the first and the second brewing chamber elements are spaced apart from each other, and an extraction position, in which the first and the second brewing chamber elements form a substantially closed brewing chamber.

Brewing apparatuses of this type are known in general. For example, EP 2 077 087 A1 discloses a brewing apparatus for a portion capsule, which brewing apparatus comprises a second brewing chamber element in the form of a receiving element with a cavity for receiving the portion capsule and a first brewing chamber element in the form of a closure element for closing the cavity. The closure element here comprises an injection arrangement for introducing extraction liquid into the portion capsule while the receiving element comprises an extraction arrangement in order to remove the extraction liquid interacting with a beverage substance arranged in the portion capsule from the portion capsule and to supply said extraction liquid to a drinking vessel in order to prepare a beverage. In order to fill the brewing apparatus with the portion capsule, the closure element is transferred into a loading position, in which said closure element is spaced apart from the receiving element. The portion capsule is subsequently inserted into an intermediate space between the receiving element and the closure element and then the closure element is displaced in an axial direction in the direction of the receiving element, as a result of which the portion capsule is inserted into the cavity in the receiving element. In the extraction position, the receiving element and the closure element form a substantially closed brewing chamber for extracting the portion capsule. The beverage substance comprises in particular roast or instant coffee to be extracted. Furthermore, it is known to provide brewing apparatuses of this type with perforation means which perforate the portion capsule in order to introduce the extraction liquid or to conduct away the beverage extract during or after the closing of the brewing chamber.

A disadvantage of such brewing apparatuses is, firstly, that, when the portion capsule is uniformly perforated, in the region of the injection arrangement the flow of extraction liquid passes through the portion capsule along the shortest route, i.e. substantially parallel to the axial direction and at a comparatively high speed, and therefore only a small interaction between the beverage substance and the extraction liquid is obtained. If the capsule is not completely filled with the beverage substance, there is also the risk of the beverage substance sliding downward in the capsule due to gravitational force and the extraction liquid flowing over and beyond the beverage substance in the direction of the outlet opening without significant interaction. Furthermore, there is a potential risk of injury for the user of the brewing apparatus if said user come into contact through the loading opening with the very sharp perforation means.

The invention is therefore based on the object of providing a brewing apparatus for extracting a portion capsule, which brewing apparatus does not have the disadvantages of the prior art and obtains a significantly improved interaction between the beverage substance and the extraction liquid as compared to the prior art, thus improving the taste quality of the extracted beverage. Furthermore, a comparatively safe and error-free insertion of the portion capsule is intended to be made possible.

SUMMARY

This object is achieved according to the invention by a brewing apparatus for extracting a portion capsule, comprising a first brewing chamber element and a second brewing chamber element, wherein the first and/or the second brewing chamber element are/is movable in an axial direction between a loading position, in which the first and the second brewing chamber elements are spaced apart from each other, and an extraction position, in which the first and the second brewing chamber elements form a substantially closed brewing chamber and wherein the first brewing chamber element has at least one first perforation means for perforating the portion capsule, said perforation means being arranged along the Earth's gravitational field below a horizontal plane extending substantially at a right angle to the gravitational field and substantially centrally through the brewing chamber.

When the portion capsule is perforated by the at least one first perforation means arranged below the horizontal plane, in particular a perforation hole, which is arranged below the horizontal plane, is advantageously produced in the portion capsule. The extraction liquid which flows, for example, through said at least one perforation hole into the portion capsule therefore does not pass through the portion capsule over the shortest route, i.e. in particular strictly parallel to the axial direction, but rather the flow direction of the extraction liquid in the interior of the portion capsule will change and fan out instead. In this case, the extraction liquid flows at angles inclined in relation to the axial direction through the portion capsule, as a result of which the interaction distance and the interaction time between the beverage substance arranged in the interior of the portion capsule and the extraction liquid passing through the portion capsule during the extraction operation are therefore increased, thus improving the taste quality of the beverage to be extracted. Furthermore, efficient interaction between the beverage substance and the extraction liquid is ensured even if the portion capsule is not completely filled with beverage substance, since the extraction liquid is introduced into the portion capsule below the horizontal plane and therefore directly in the region of the beverage substance which has slid downward due to gravitational force. Furthermore, it is advantageously possible in this manner to obtain the taste quality known from the prior art using a reduced quantity of the beverage substance contained in the portion capsule. A further advantage of the brewing chamber according to the invention is that, when the portion capsule is introduced between the first and second brewing chamber elements, sticking of the portion capsule against the at least one first perforation means can be prevented in a simple manner, since the at least one first perforation means is spaced as far as possible from the insertion opening for the portion capsule in the case of the brewing apparatus according to the invention. Furthermore, by means of said distance between the at least one first perforation means and the insertion opening, which distance is increased in comparison to the prior art, the risk of injury for a user of the brewing apparatus is considerably reduced.

According to a further subject matter or a preferred development of the present invention, it is provided that the first brewing chamber element has a base surface facing the second brewing chamber element, wherein the first brewing chamber element has a plurality of first perforation means, wherein the first perforation means are arranged within an angular range of at maximum 230 degrees about the central point. In the case of a portion capsule which is only partially filled with beverage substance, the portion capsule is advantageously perforated only where the beverage substance is also arranged (which, for example, has slid downward due to the effect of the gravitational force). In this case, the angular range of at maximum 230 degrees ensures that efficient extraction is obtained even if the slipped beverage substance protrudes, for example, upward over the horizontal plane (in this case, more than half of the portion capsule is filled with beverage substance). The first brewing chamber element preferably comprises at least four first perforation means in order to obtain as high a throughput of extraction liquid as possible. The first perforation means are preferably arranged in an asymmetrically distributed manner in relation to a plane extending in the axial direction. The plane here comprises in particular the horizontal plane extending at a right angle to the gravitational field and centrally through the brewing chamber. The first perforation means are in particular arranged with a substantially constant radius about a central point of the base surface. That wall of the portion capsule which faces the first brewing chamber element is therefore advantageously in particular not perforated centrally but rather in the edge region thereof. Since the portion capsule is particularly stable in the edge region, for example because of the flange of the portion capsule and/or because of the connection to the side walls of the portion capsule, the material of the portion capsule, in particular the portion capsule cover, only insignificantly yields at this point during the perforation operation, thus ensuring a more reliable and simpler perforation operation.

According to a preferred embodiment of the present invention, the first brewing chamber element comprises precisely one single first perforation means. A comparatively simple and reliable insertion of the portion capsule is therefore advantageously ensured in the loading position, since the risk of the portion capsule remaining stuck to perforation means in the region of the insertion opening is effectively avoided. Furthermore, the risk of injury for a user of the brewing apparatus is considerably reduced in comparison to the prior art, since there is only one single first perforation means and, furthermore, this one first perforation means is arranged spaced apart from the insertion opening. If a user places a finger into the insertion opening, said finger will advantageously generally reach the first perforation means only with difficulty, if at all. The first perforation means is preferably arranged substantially in a lower edge region of the first brewing chamber element in the gravitational field in order to produce a maximum distance between the insertion opening and the first perforation means. Furthermore, during the extraction operation, the one first perforation means produces a comparatively large swirling of the extraction liquid in the portion capsule, and as long an interaction distance as possible, thus having a positive influence on the taste quality of the beverage to be extracted. Furthermore, the portion capsule is perforated by the first perforation means in the lower region of said capsule, in which the beverage substance is always also located due to the effect of the gravitational force (even if the portion capsule is only partially filled with beverage substance).

According to a preferred development, it is provided that, in the loading position, the portion capsule is fed in a loading direction between the first and the second brewing chamber elements, wherein the loading direction is oriented substantially at a right angle to the horizontal direction. The portion capsule is therefore advantageously inserted into the brewing apparatus under the concomitant action of the gravitational force. A user in particular merely has to drop the portion capsule, thus substantially simplifying the loading operation.

It is conceivable for the first brewing chamber element in the loading position preferably to be inclined in relation to the second brewing chamber element in order to enable the brewing apparatus to be loaded in as simple a manner as possible with a portion capsule. In this case, the movement from the loading position into the extraction position comprises, for example, an axial displacement of the first brewing chamber element in the axial direction and also a pivoting of the first brewing chamber element parallel to the second brewing chamber element. Particularly preferably, it is provided that, after the brewing chamber has been filled with a portion capsule and in order to initiate the brewing operation, the first brewing chamber element is moved from the loading position at least in the axial direction in the direction of the second brewing chamber element in order to reach the extraction position. In this case, the first brewing chamber element is preferably pivoted through an angle of between 1 and 40 degrees, particularly preferably between 1 and 20 degrees, and very particularly preferably between 1 and 10 degrees.

According to a further subject matter or a preferred development of the present invention, it is provided that the brewing apparatus is designed in such a manner that, upon movement of the first and/or second brewing chamber element from the loading position into the extraction position, the portion capsule is perforated substantially sequentially by a plurality of first perforation means of the first brewing chamber element. A reduction in the required force necessary for perforating the portion capsule by means of the first perforation means can therefore be obtained in an advantageous manner, since not all of the first perforation means penetrate the portion capsule simultaneously.

According to a further subject matter or a preferred development of the present invention, it is provided that the brewing device is designed in such a manner that, upon movement of the first and/or the second brewing chamber element from the loading position into the extraction position, the portion capsule is first of all perforated by the at least one first perforation means of the first brewing chamber element and only then is perforated by at least one second perforation means of the second brewing chamber element. The portion capsule is therefore advantageously first of all perforated on the side of the first brewing chamber element and only then on the side of the second brewing chamber element. The effort required overall for perforating the portion capsule is therefore reducible. It is also conceivable for the first brewing chamber element to have a multiplicity of first perforation means.

According to a further subject matter or a preferred development of the present invention, it is provided that in the loading position, the portion capsule is fed in a loading direction between the first and the second brewing chamber elements, wherein the first brewing chamber element has at least one first perforation means for perforating the portion capsule, and wherein the cutting plane of the at least one first perforation means is oriented substantially at a right angle to the loading direction. The risk of injury for a user of the brewing apparatus is therefore advantageously considerably reduced. A user who, for example, reaches with his/her finger in the loading direction into the region between the first and second brewing chamber elements moves his/her finger perpendicularly to the cutting plane, thus reducing the risk of a cutting injury. In particular, the risk of direct contact of the finger with the cutting edge of the at least one first perforation means designed in particular as a cutting blade is reduced, since, during a movement in the loading direction, the finger primarily contacts only the blunt side of the cutting blade. Within the context of the present invention, the wording "substantially perpendicular" means in particular that the cutting plane extends perpendicularly to the loading direction at least in a transverse direction perpendicular to the axial direction. The angle between the cutting plane and the loading direction preferably comprises an angle of between 50 and 130 degrees, particularly preferably between 70 and 110 degrees, and very particularly preferably between 80 and 100 degrees. Alternatively, the first brewing chamber element has a plurality of first perforation means.

According to a preferred development, it is provided that the brewing apparatus has a feeding opening which is provided for feeding the portion capsule in a loading direction between the first and the second brewing chamber elements, wherein, preferably, at least the one first perforation means has a cutting plane, which is oriented substantially perpendicular to the loading direction, at the smallest distance from the feeding opening. A risk of injury for the user is based in particular on the first perforation means which is the closest to the feeding opening for loading the brewing apparatus with a portion capsule in comparison to the remaining first perforation means, if more than one first perforation means is provided at all, and therefore already simply by an appropriate orientation of said at least one first perforation means, the risk of injury is substantially reduced.

According to a preferred development, it is provided that the at least one first perforation means is designed as a perforation point which protrudes from the first brewing chamber element substantially in the direction of the second brewing chamber element. The at least one perforation point preferably has a substantially linear cross section in the axial direction of preferably rectilinear or curved design. In particular, the at least one perforation point has a substantially triangular profile perpendicular to the axial direction. This permits a comparatively simple perforation with little effort, since the piercing resistance is comparatively low. Alternatively, the first brewing chamber element has a plurality of first perforation means which are each designed in the form of a perforation point.

According to a preferred development, it is provided that the first brewing chamber element, on an end side facing the second brewing chamber element, has a perforation element which comprises a central surface region which is connected integrally along the circumference thereof to the at least one perforation means. The perforation element is produced in particular by the at least one first perforation means being bent in relation to the surface region by buckling. This permits a particularly stable design and fastening of the at least one first perforation means and at the same time cost-effective production. Alternatively, the perforation element has a plurality of first perforation means which are each designed in the form of a bent-over perforation point.

According to a preferred development, it is provided that the first brewing chamber element and in particular the perforation element has, in the surface region, at least one water outlet opening for feeding liquid into the portion capsule perforated by means of the at least one first perforation means, wherein, preferably, the water outlet opening is arranged substantially adjacent to the at least one first perforation means. The extraction liquid is therefore advantageously introduced into the brewing chamber directly into the region of the perforation openings, and therefore the extraction liquid can flow into the portion capsule virtually without loss of pressure. As an alternative, the perforation element has a plurality of water outlet openings which are each arranged adjacent to the first perforation means if the brewing apparatus is intended to have a plurality of first perforation means.

According to a preferred development, it is provided that the second brewing chamber element has at least one second perforation means which is arranged asymmetrically in relation to the plane and in particular in relation to the horizontal plane, wherein the second perforation means is preferably arranged below the horizontal plane. Therefore, in particular an opening for conducting the extraction liquid out of the portion capsule is advantageously produced. In an advantageous manner, said opening lies below the horizontal plane, thus assisting the abovementioned oblique flow through the portion capsule, i.e. the direction of flow of the extraction liquid is inclined in relation to the axial direction within the portion capsule and therefore the taste quality of the extracted beverage is enhanced. The second perforation means comprises, for example, a cutting blade, a hollow needle or a point provided with channels.

According to a preferred development, it is provided that the second perforation means comprises a piercing point which protrudes from the second brewing chamber element substantially in the direction of the first brewing chamber element and is preferably provided with lateral grooves at least over a subregion. The conducting away of the extraction liquid out of the portion capsule is advantageously promoted by the lateral grooves, since the extraction liquid can flow out of the portion capsule between the second perforation means and the capsule material, in particular the material of the portion capsule base, within the grooves.

According to a preferred development, it is provided that the second perforation means is coupled releasably to the second brewing chamber element in particular via a latching and/or screw fastening. Installation and removal of the second perforation means, for example for cleaning and service purposes, is therefore advantageously facilitated.

According to a preferred development, it is provided that the second brewing chamber element comprises a hollow bell-shaped element for receiving the portion capsule, wherein a base region of the bell-shaped element comprises at least one depression for conducting away extraction liquid from the portion capsule perforated by means of the second perforation means, where in the second perforation means is preferably arranged in the region of the depression, and wherein the depression preferably leads into a drainage channel for removing the extraction liquid from the brewing chamber. The depression preferably comprises a support and/or pillar structure, as a result of which the portion capsule is reliably spaced apart from the second brewing chamber element in the region of the depression. This prevents a reduction in the cross section of the depression by the capsule base, and therefore conducting away of the extraction liquid can be ensured at all times.

According to a further subject matter or a preferred development of the present invention, it is provided that the first brewing chamber element has at least one first perforation means for perforating the portion capsule, and in that the brewing apparatus has at least one spacing element which is designed in such a manner that, when the portion capsule is fed between the first and the second brewing chamber elements in the loading position, mechanical contact between the portion capsule and the at least one first perforation means is prevented by the spacing element. In the case of brewing apparatuses according to the prior art, when a portion capsule is fed between the first and second brewing chamber elements during the loading position, there is the risk of the portion capsule remaining stuck to the at least one first perforation means and of fault-free feeding of the portion capsule being prevented. In the case of the brewing apparatus according to the invention, the portion capsule is advantageously effectively prevented from remaining stuck in this manner on the first perforation means by the spacing element by, during the feeding of the portion capsule, the spacing element ensuring that the portion capsule is spaced apart from the first brewing chamber element and from the at least one first perforation means. Fault-free feeding of portion capsules is therefore advantageously ensured. Alternatively, the first brewing chamber element has a plurality of first perforation means and/or a plurality of spacing elements.

According to a preferred development, it is provided that the first brewing chamber element comprises two first perforation means in the form of two perforation points, wherein the spacing element is at least partially arranged between the two perforation points, and wherein, in the loading position, the spacing element is spaced apart from the first brewing chamber element at least in the region between the two perforation points, and wherein the two perforation points are preferably arranged in the gravitational field below the horizontal plane. The risk of the portion capsule remaining stuck to the first perforation points is therefore advantageously further reduced, since the spacing element is spaced apart from the first brewing chamber element, in particular in the region of the first perforation points, and therefore the portion capsule is protected from direct mechanical contact with the first perforation points. In addition, this realizes effective finger protection, by means of which a user reaching into the brewing chamber is protected from contact with the sharp first perforation means.

According to a preferred development, it is provided that the spacing element is fastened to the first brewing chamber element and is at least partially pretensioned elastically in the direction of the second brewing chamber element, and/or in that the spacing element is designed in such a manner that, in the extraction position, said spacing element bears substantially completely against the first brewing chamber element. The spacing element is advantageously spaced apart from the first brewing chamber element in the loading position while said spacing element bears against the first brewing chamber element in the extraction position such that the extraction operation is not impaired by the spacing element. This is obtained by the spacing element being pretensioned elastically in the direction of the second brewing chamber element and in particular being of flexible design. During closure of the brewing chamber, the portion capsule is pressed in the direction of the first brewing chamber element such that the spacing element automatically also enters into contact with the first brewing chamber element.

According to a preferred development, it is provided that the spacing element comprises a metal strip, wherein the metal strip has a first end which is fastened to the first brewing chamber element and a free, second end, wherein, in the loading position, the second end preferably protrudes from the first brewing chamber element obliquely in the direction of the second brewing chamber element, or, in the loading position, preferably bears against a surface of the first brewing chamber element, which surface faces the second brewing chamber element. In the loading position, the free, second end advantageously protrudes obliquely in the direction of the second brewing chamber element such that the spacing element acts like a leaf spring which keeps the portion capsule at a distance from the at least one first perforation means in the loading position. Alternatively, it is conceivable for the metal strip additionally to have a curvature in the direction of the second brewing chamber element, thus increasing the spring action. The second end may protrude obliquely again in the direction of the second brewing chamber element or alternatively may also bear against the first brewing chamber element in the loading position.

According to a preferred development, it is provided that the metal strip has a passage hole, and/or in that the metal strip is oriented substantially parallel to the loading direction. The extraction liquid preferably flows through the passage hole in the direction of the portion capsule, wherein the passage hole is preferably aligned with an extraction liquid access opening in the first brewing chamber element. As an alternative to the metal strip, it is conceivable for the spacing element to be designed in the same manner but to be manufactured from a plastics material.

A further subject matter of the present invention is a method for operating a brewing apparatus, wherein, in a first method step, a portion capsule is inserted between the first and the second brewing chamber elements, and wherein, in a subsequent second method step, the first and/or the second brewing chamber element is moved substantially in the axial direction from the loading position into the extraction position and wherein, during the second method step, the portion capsule is firstly perforated below the horizontal plane by at least one first perforation means of the first brewing chamber element and subsequently the portion capsule is perforated by at least one second perforation means of the second brewing chamber element. The portion capsule is therefore advantageously perforated in a lower region in the gravitational field. Due to the effect of the gravitational force, the beverage substance likewise slides into the lower region. It is therefore ensured that a perforation opening is produced in the region of the beverage substance such that efficient interaction between the extraction liquid and the beverage substance is obtained during the extraction operation. The first brewing chamber element here alternatively either has precisely one single first perforation means or a plurality of first perforation means.

According to a further subject matter or a preferred development of the present invention, it is provided that during the second method step, the portion capsule is perforated sequentially by a plurality of first perforation means of the first brewing chamber element. The required effort for perforating the portion capsule and for closing the brewing chamber is thereby reduced if a plurality of first perforation means is used.

According to a further subject matter or a preferred development of the present invention, it is provided that, in the second method step, the portion capsule is perforated by precisely one first perforation means. Therefore, in the loading position, a comparatively simple and safe insertion of the portion capsule is advantageously ensured. Furthermore, the risk of injury for a user of the brewing apparatus is considerably reduced in comparison to the prior art. The first perforation means is preferably arranged substantially in a lower edge region of the first brewing chamber element in the gravitational field in order to produce a maximum distance between the insertion opening and the first perforation means.

According to a further subject matter or a preferred development of the present invention, it is provided that, in a third method step, extraction liquid is introduced into the portion capsule only below the horizontal plane and/or within the angular range of at maximum 230 degrees. This advantageously ensures that, during the extraction operation, extraction liquid is introduced into the portion capsule only wherever the beverage substance is also located (which, for example, has slid downward due to the effect of the gravitational force). Accordingly, it would be conceivable for the portion capsule also to be perforated above the horizontal plane or outside the angular range of 230 degrees, but for the extraction liquid to be introduced only below the horizontal plane and/or only within the angular range of at maximum 230 degrees.

According to a preferred development, it is provided that a capsule cover of the portion capsule is perforated by the at least one first perforation means, and that a capsule base of the portion capsule is perforated by the second perforation means.

According to a further subject matter or a preferred development of the present invention, it is provided that in the first method step, the portion capsule, while being fed between the first and second brewing chamber elements, is at least partially guided by a spacing element, which is fastened to the first brewing chamber element, in such a manner that mechanical contact between the portion capsule and the at least one first perforation means is prevented by the spacing element. In an advantageous manner, the portion capsule is kept at a distance from the first brewing chamber element and therefore in particular also from the at least one first perforation means by the spacing element upon insertion between the first and second brewing chamber element. The insertion operation is therefore less error-prone, since the portion capsule is effectively prevented from remaining stuck against the at least one first perforation means. Alternatively, the first brewing chamber element has a plurality of first perforation means and/or a plurality of spacing elements.

According to a preferred development, it is provided that, during the first method step, the spacing element at least partially protrudes from the first brewing chamber element in the direction of the second brewing chamber element, wherein, in the second method step, the spacing element is brought into contact with the first brewing chamber element. During the transfer of the first brewing chamber element from the loading position into the extraction position, the spacing element is advantageously automatically pressed in the direction of the first brewing chamber element such that the extraction operation is not impaired by the spacing element. In particular, the spacing element therefore does not protrude into the brewing chamber in the extraction position. In this case, the spacing element is in particular bent by an at least partially curved shaping into a rectilinear shape.

A further subject matter of the present invention is a method for producing a brewing apparatus, wherein, in a first production step, a perforation element is punched out with a central surface region and a plurality of first perforation means, wherein, in a second production step, the first perforation elements are bent in relation to the surface region by buckling in such a manner that the first perforation means protrude at a right angle from the surface region, and wherein, in a third production step, the perforation element is connected to the first brewing chamber element. This permits a particularly stable design of the first perforation means and secure fastening of the first perforation means to the first brewing chamber element. Furthermore, the production is particularly cost-effective. The perforation element is preferably screwed to the first brewing chamber element. The perforation element comprises in particular a sheet-metal material. Preferably, in the first production step, the perforation element is provided in the surface region with a plurality of water outlet openings, wherein each of the water outlet openings is particularly preferably arranged adjacent to a first perforation element. In a fourth production step, at least one second perforation means is connected to the second brewing chamber element, wherein use is made in particular of a latching and/or screw connection.

Use of a brewing apparatus according to the invention for preparing hot beverages, in particular coffee, milk, tea and/or chocolate beverages.

The invention is explained in more detail below with reference to exemplary embodiments which are illustrated in drawings. The drawings merely illustrate exemplary embodiments of the invention that do not restrict the essential concepts of the invention.

BRIEF DESCRIPTION OF THE DRAWINGS

FIG. 8 shows a schematic view of a first brewing chamber element of a brewing apparatus according to an eighth embodiment of the present invention.

In the various figures, identical parts are always provided with the same reference numbers and are therefore generally also referred to or mentioned only once in each case.

DETAILED DESCRIPTION

Figure 1A:
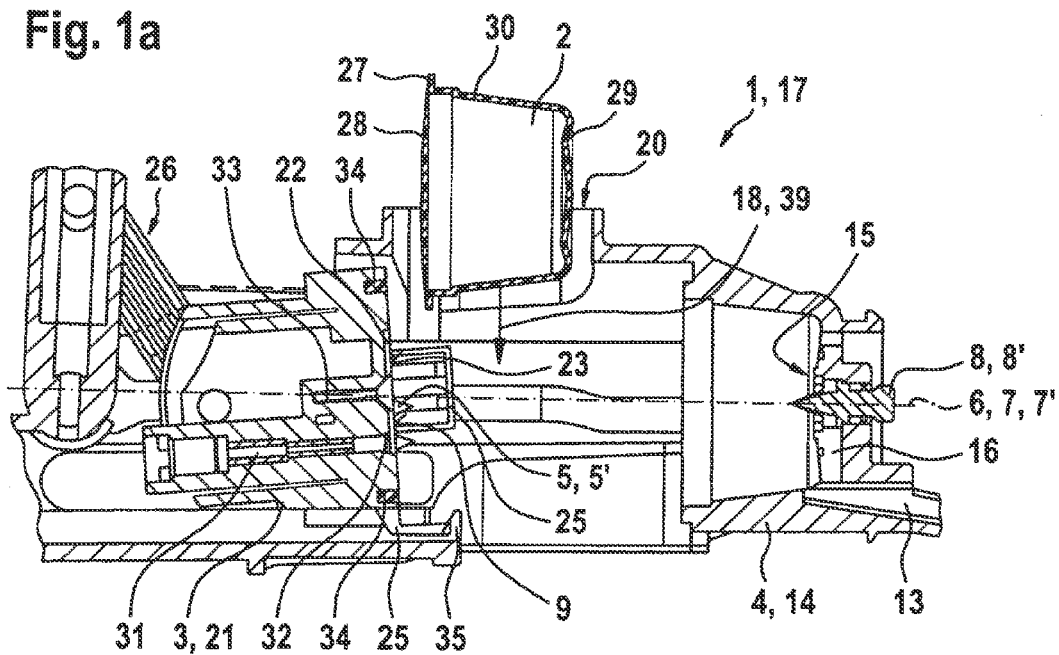
FIGS. 1a to 1k show schematic sectional drawing views of a brewing apparatus according to a first embodiment of the present invention.

FIGS. 1a to 1k illustrate schematic sectional drawing views of a brewing apparatus 1 for extracting a portion capsule 2 according to a first embodiment of the present invention. The brewing apparatus 1 here comprises a second brewing chamber element 4 which is designed as a receiving element or partially hollow bell-shaped element 14, and a first brewing chamber element 3 which is designed as a closure element 21 or piston. The first brewing chamber element 3 is movable relative to the second brewing chamber element 4 in an axial direction 6 between a loading position 17 illustrated in FIGS. 1a and 1k and an extraction position 11 illustrated in FIG. 1f.

The portion capsule 2 comprises a truncated cone 30 which is manufactured from plastic and is of cup-shape design. The truncated cone 30 is closed in an airtight manner by means of a capsule cover 28 manufactured from a plastics film and/or aluminum foil. A beverage substance, in particular a roast coffee powder which can be extracted by means of an extraction liquid is located within the portion capsule 2. The portion capsule 2 optionally has a filtering element (not depicted) which is arranged (possibly spaced apart from the capsule base 29) between the capsule base 29 and the beverage substance. The capsule cover 28 is adhesively bonded or welded to the truncated cone 30 in the region of a capsule flange 27.

The first brewing chamber element 3 has a perforation element 22 on a side facing the second brewing chamber element 4, said perforation element comprising a substantially round base surface 9, on the peripheral region of which four first perforation means 5 are formed in the circumferential direction. In this case, the first perforation means 5 are arranged with a virtually constant radius about a central point 201 (see FIG. 8) on the base surface 9 of the first brewing chamber element 3, which base surface faces the second brewing chamber element 4. The first perforation means 5 each comprise a perforation point 5' which protrudes from the base surface 9 in the direction of the second brewing chamber element 4. Furthermore, four water outlet openings 24 (which cannot be seen for perspective reasons in FIGS. 1a to 1k) are formed in the base surface 9, wherein precisely one water outlet opening 24 is always arranged in the vicinity of a perforation point 5'. The first perforation means 5 are all arranged in the Earth's gravitational field 39 below a plane 7 designed as a horizontal plane 7'. The horizontal plane 7' extends substantially centrally through the brewing chamber 1' and substantially at a right angle to the gravitational field 39.

In an alternative embodiment which is not illustrated in detail, the brewing apparatus 1 has only precisely one single first perforation means 5 which is arranged in the gravitational field 39 below the horizontal plane 7'. The one first perforation means 5 here is preferably arranged substantially in a lower edge region of the first brewing chamber element 3 in the gravitational field 39 in order to produce a maximum distance between the feeding opening 20 and the first perforation means 5.

The first brewing chamber element 3 has a water feeding channel 31 which opens into an indentation 32 formed between the first brewing chamber element 3 and the perforation element 2 such that extraction liquid fed in by the water feeding channel 31 can be distributed via the indentation 32 to the four water outlet openings 24. The perforation element 22 is fastened to the first brewing chamber element 3 by means of a screw 33. The second brewing chamber element 4 has a second perforation means 8 which comprises a piercing point 8' which points in the direction of the first brewing chamber element 3, is arranged within the cavity and is releasably connected to the second brewing chamber element 4 via a latching fastening. The piercing point 8' is provided with lateral grooves which extend parallel to the axial direction 6. In the region of the piercing point 8', the second brewing chamber element 4 has a depression 16 in the base region 15 of the cavity, into which depression a drainage channel 13 leads.

FIG. 1a illustrates the first brewing chamber element 3 in the loading position 17, i.e. the first brewing chamber element 3 is spaced apart from the second brewing chamber element 4 in the axial direction 6. In said starting position, the portion capsule 2 is then inserted in a loading direction 18 by a user (not depicted). For this purpose, a housing of the brewing apparatus 1, which housing is designed as part of the second brewing chamber element 4, has a feeding opening 20 through which the portion capsule 2 is inserted.

Figure 1B:
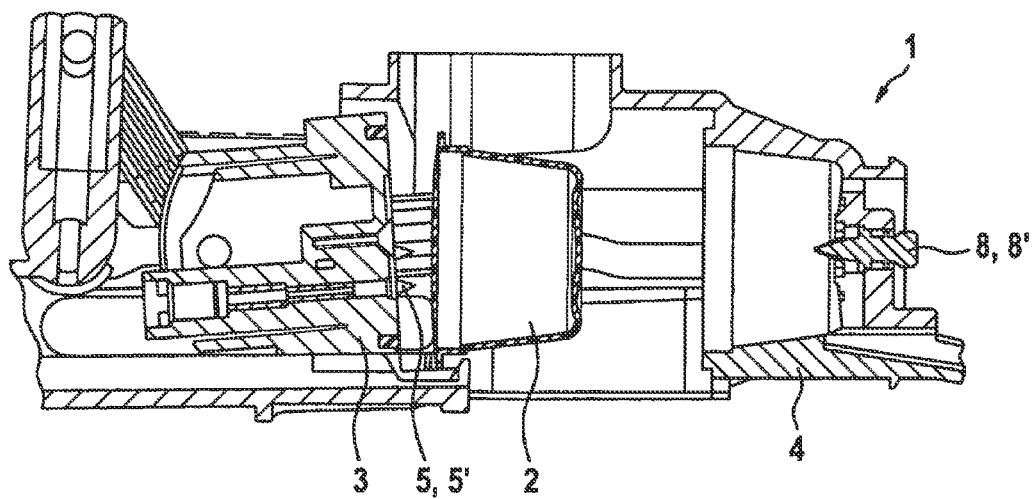

It is illustrated in FIG. 1b that the portion capsule 2 drops laterally under the effect of the gravitational force into the region between the first and the second brewing chamber elements 3, 4 and is held at the first brewing chamber element 3 by means of holding means 25 (not described specifically) engaging the capsule flange 27 of the portion capsule 2.

Figure 1C:
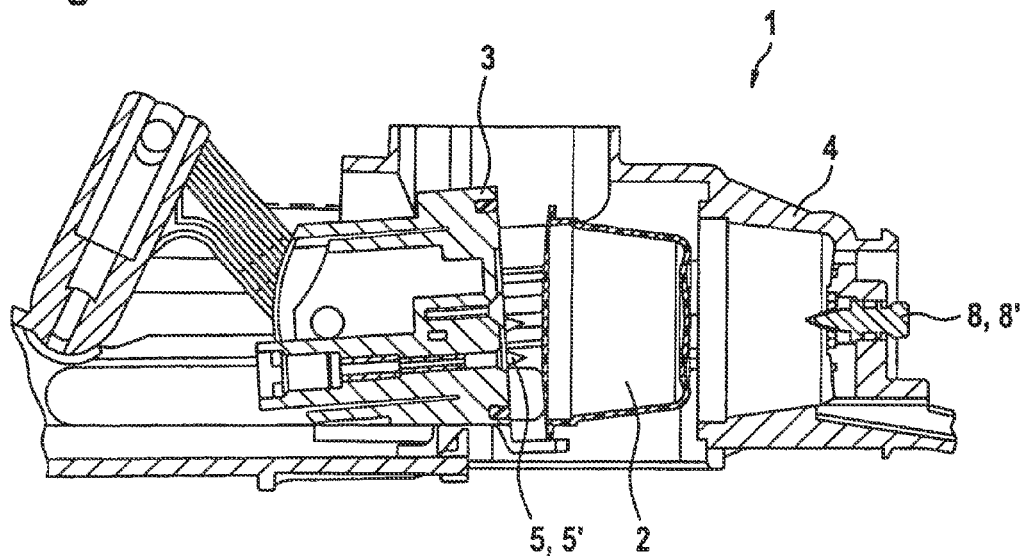

In the next step, illustrated with reference to FIG. 1c, the first brewing chamber element 3 is driven by a toggle lever joint 26 to move in the direction of the second brewing chamber element 4.

Figure 1D:
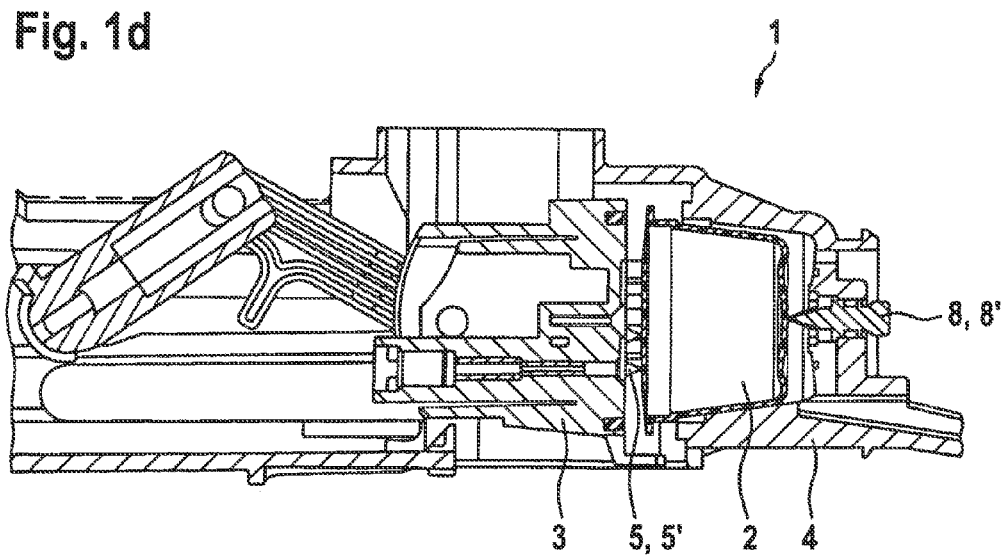

It is illustrated with reference to FIG. 1d that, shortly before the capsule base 29 touches the piercing point 8', the first brewing chamber element 3 is set upright in such a manner that the base surface 9 is oriented virtually exactly perpendicular to the axial direction 6. The perforation points 5' subsequently touch the capsule cover 28.

Figure 1E:
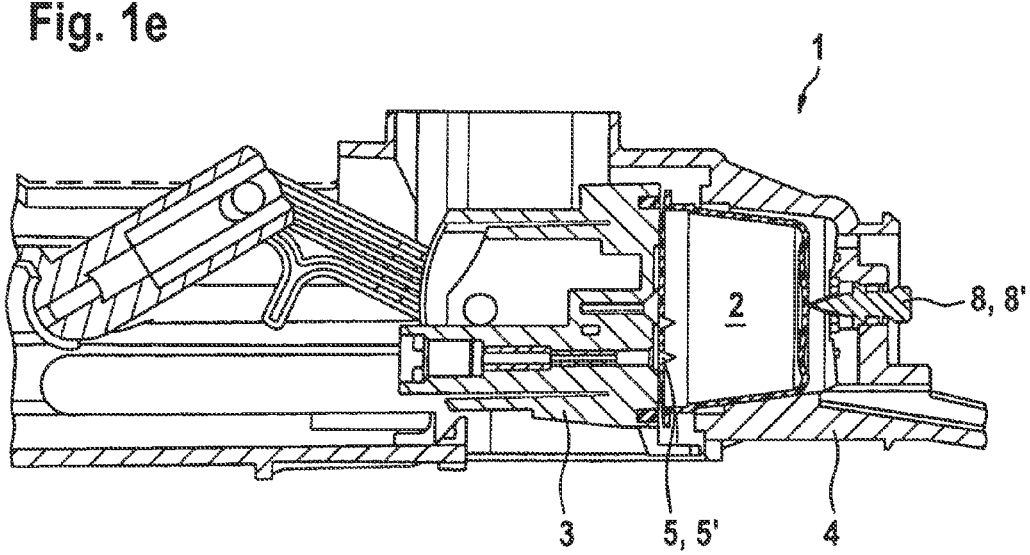

In the next step, illustrated in FIG. 1e, the capsule cover 28 is perforated by the first perforation means 5, which are designed as perforation points 5', by the continuous movement of the first brewing chamber element 3 in the direction of the second brewing chamber element 4. The capsule cover 28 is only perforated by the first perforation means 5 below the horizontal plane 7'. At this time, the capsule base 29 is not yet perforated.

In the abovementioned alternative embodiment, the capsule cover 28 is perforated only by the precisely one first perforation means 5 in a lower region in the gravitational field 39.

Figure 1F:
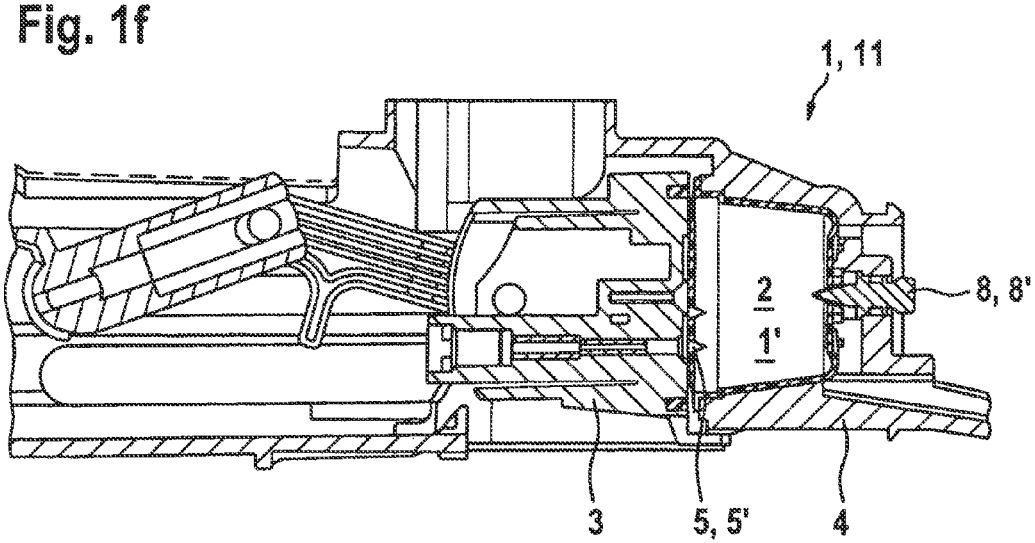
Figure 1G:
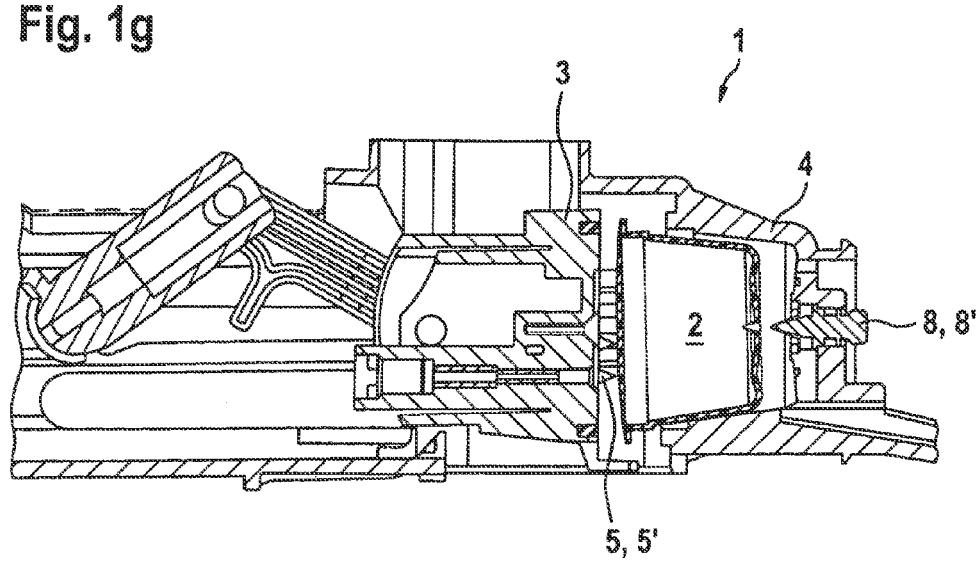
Figure 1H:
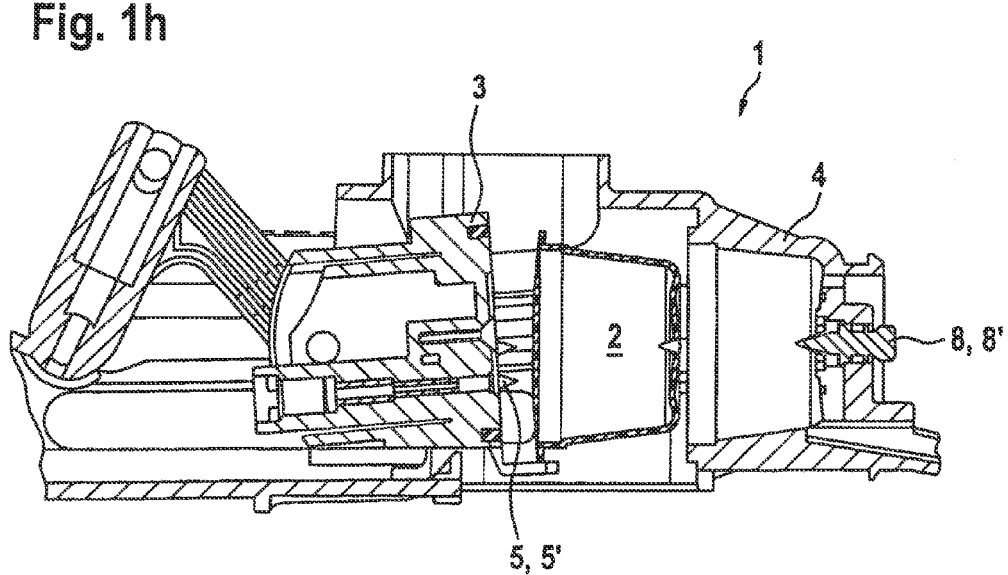
Figure 1I:
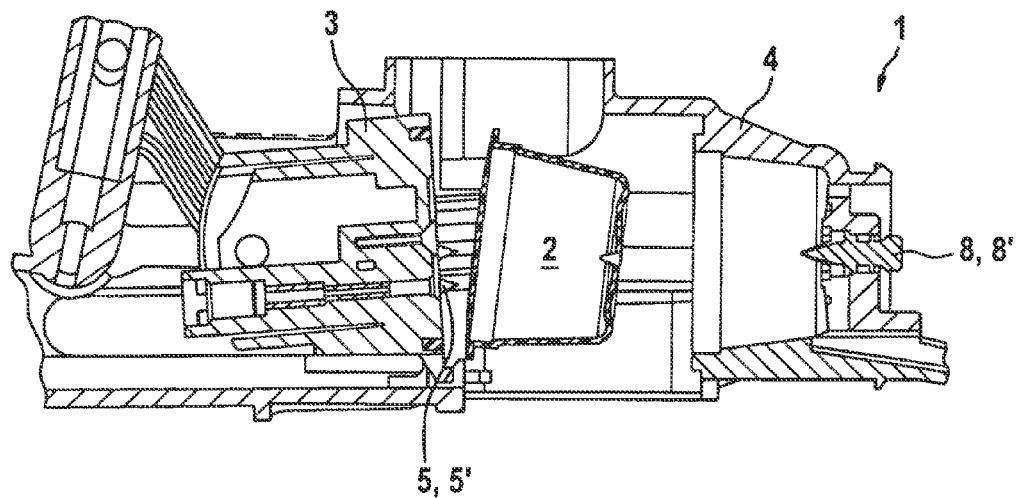
Figure 1J:
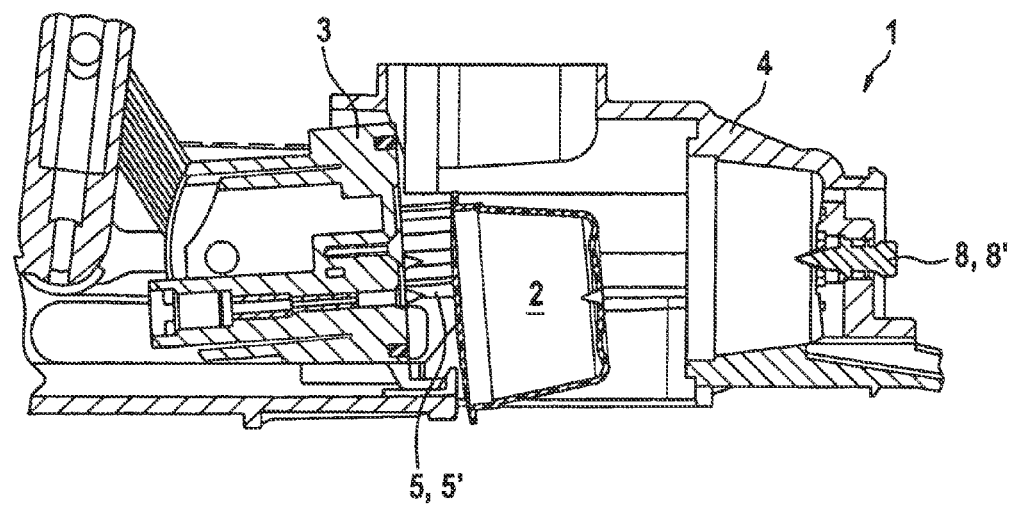

In FIG. 1f, the first brewing chamber element 3 is displaced as far as the second brewing chamber element 4 in the axial direction 6 into the extraction position 11 such that the portion capsule 2 is virtually completely inserted into the hollow bell-shaped element 14 and the capsule base 29 is then perforated by the second perforation means 8, which is designed as a piercing spike 8'. The first and the second brewing chamber elements 3, 4 therefore form a hermetically closed brewing chamber 1', in which the portion capsule 2 is arranged. In this case, the capsule flange 27 is fixedly clamped between the first and the second brewing chamber elements 3, 4, in particular by means of an elastic sealing ring 34.

In this position, the extraction operation is initiated, i.e. extraction liquid in the form of pressurized and heated water is fed to the brewing chamber 1'. The extraction liquid is conveyed through the water feeding channel 31 and the indentation 32 to the water outlet openings 24 and passes from there through the perforation openings, which are produced by means of the first perforation means 5, in the capsule cover 28 into the portion capsule 2. The extraction liquid flows through the beverage substance, thus forming a beverage extract which leaves the portion capsule 2 again through the perforation hole produced in the capsule base 29 by means of the piercing spike 8' and passes through the depression 16 into the drainage channel 13. By means of the drainage channel 13, the beverage extract is preferably fed directly to a drinking vessel (not depicted), such as a coffee cup. In each case, the extraction liquid passes through the portion capsule 2 in the region of the beverage substance arranged in the portion capsule 2, even if said beverage substance slides downward in the portion capsule 2 due to the effect of the gravitational force.

After the extraction operation, the first brewing chamber element 3 is moved back again from the extraction position 11 into the loading position 17 parallel to the axial direction 6. This is illustrated with reference to FIGS. 1g to 1j. In the process, the used portion capsule 2 is called back again by the first brewing chamber element 3 until the capsule flange 27 enters into contact with an ejector 35 (not described specifically), as a result of which the portion capsule 2 is disengaged from the holding means 25 and automatically drops under the effect of the gravitational force out of the region between the first and the second brewing chamber elements 3, 4, for example into a collecting container (not shown).

Figure 1K:
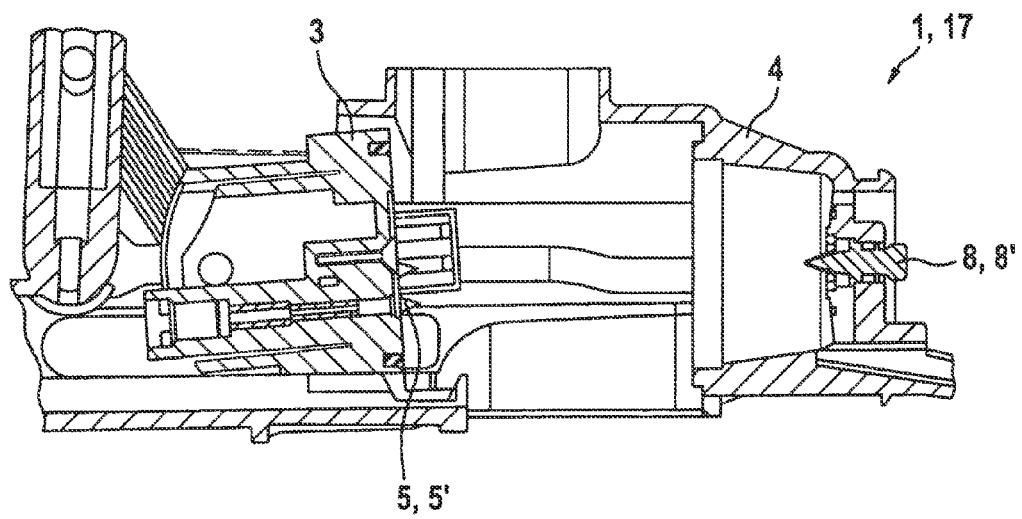

Subsequently, the first brewing chamber element 3 is again located, as shown in FIG. 1k, in the loading position 17, and therefore renewed filling of the brewing apparatus 1 with an unused portion capsule 2 is possible as per FIG. 1a.

Figure 2A:
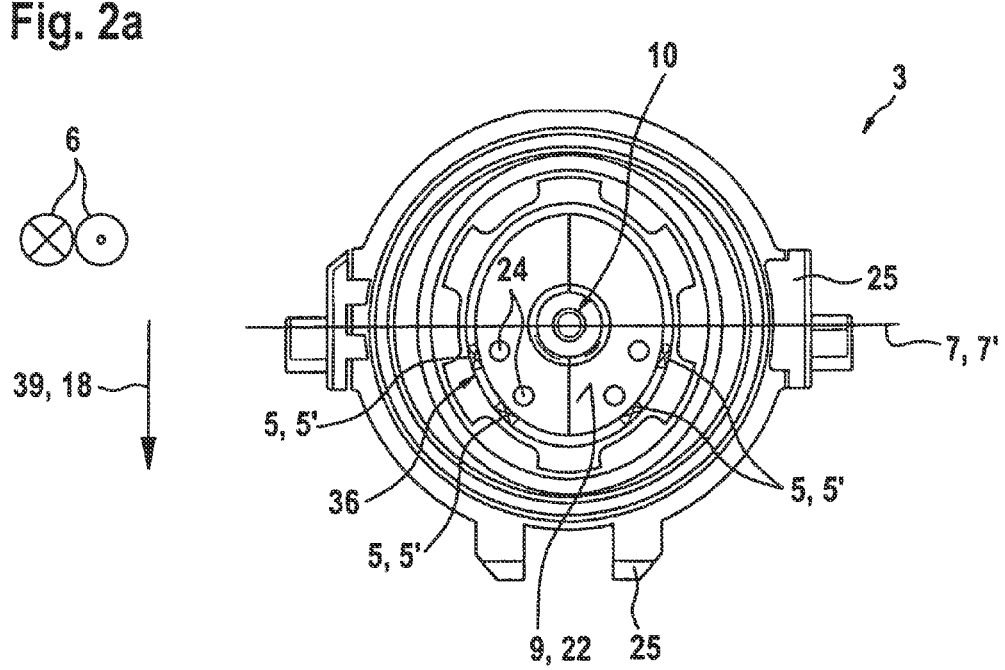
FIGS. 2a to 2c show schematic views of a first brewing chamber element of a brewing apparatus according to a second embodiment of the present invention.
Figure 2B:
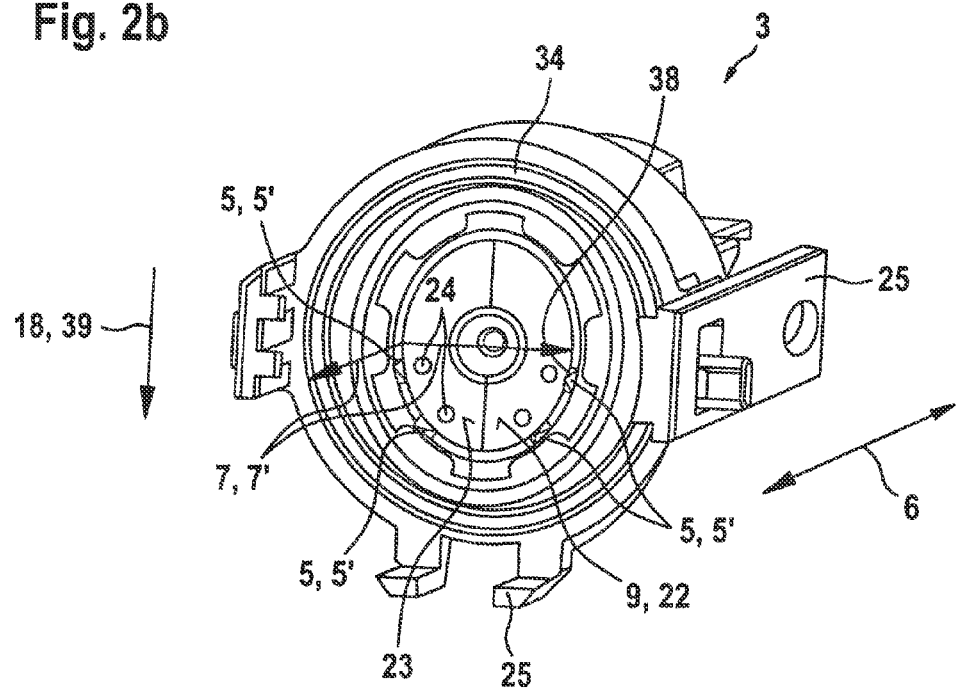
Figure 2C:
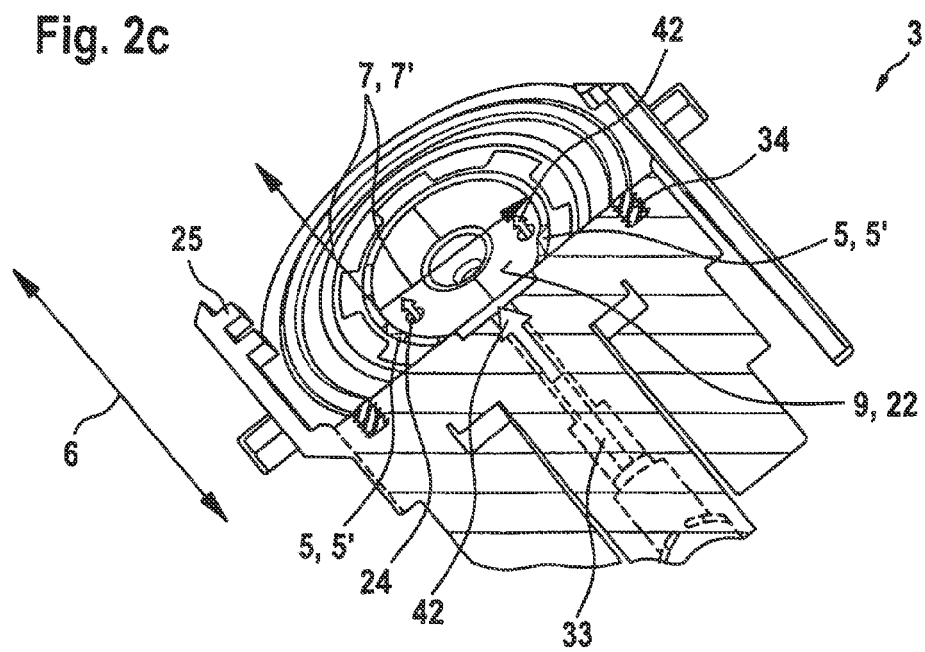

FIGS. 2a to 2c illustrate schematic views of a first brewing chamber element 3 of a brewing apparatus 1 according to a second embodiment of the present invention, wherein the brewing apparatus 1 according to the second embodiment is substantially equivalent to the brewing apparatus 1, which is illustrated in FIGS. 1a to 1k, according to the first embodiment. The first perforation means 5 are designed as perforation points 5' which, in the projection in the axial direction 6, have virtually a linear cross section 36 which is bent along the circumference of the base surface 9. In a plane parallel to the axial direction 6, the perforation points 5' each have a triangular profile which in each case runs parallel to the cutting plane 19, since the cutting edges of the perforation points 5' are each formed by the legs 38 of the triangles. The perforation points 5' are each arranged in a plane perpendicular to the axial direction 6 with a virtually constant radius (the end surface 9 is slightly oval instead of round) about a central point 201 on the base surface 9. Within the scope of a punching process, the perforation element 22 with a base surface 9 and perforation points 5' is punched from sheet metal and the perforation points 5' are subsequently bent in relation to the base surface 9 by buckling in such a manner that the perforation points 5' protrude perpendicularly from the peripheral region of the base surface 9. The perforation points 5' are distributed along the peripheral region in such a manner as to be distributed asymmetrically in relation to a plane 7 extending in the axial direction 6, i.e. the first perforation means 5 are arranged exclusively below the plane 7. In this case, the plane 7 comprises in particular a horizontal plane 7' which is formed substantially virtually perpendicular to the gravitational field 39 and/or to the loading direction 18. FIG. 2c illustrates the flow of the extraction liquid in the direction of the brewing chamber 1' with reference to arrows 42.

Figure 3:
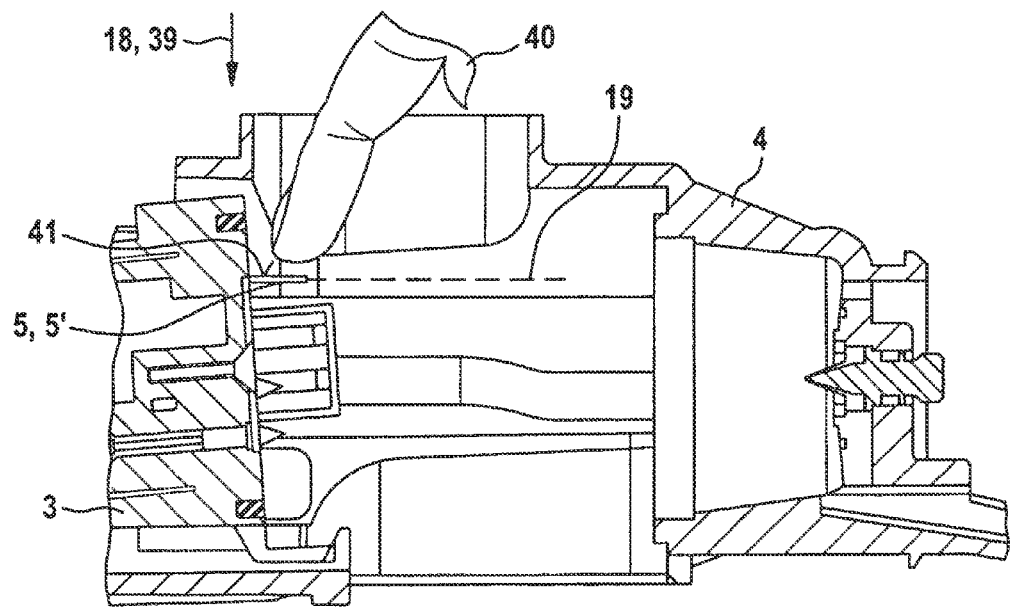
FIG. 3 shows a schematic sectional drawing view of a first brewing chamber element of a brewing apparatus according to a third embodiment.

FIG. 3 illustrates a schematic sectional drawing view of a first brewing chamber element 3 of a brewing apparatus 1 according to a third embodiment, wherein the brewing apparatus 1 according to the third embodiment is substantially equivalent to the brewing apparatus 1, which is illustrated in FIGS. 2a to 2c, according to the second embodiment, wherein, in contrast to the second embodiment, the first perforation means 5, 5' has, at the smallest distance from the feeding opening 20, a cutting plane 19 which is oriented substantially perpendicular to the loading direction 18 and/or to the gravitational field 39. A finger 40 of a user reaching from above through the feeding opening 20 into the brewing apparatus 1 therefore merely comes into contact with the blunt side surface 41 of said first perforation means 5, thus considerably reducing the risk of injury. It is alternatively conceivable for said first perforation means 5, 5' also to be arranged at the smallest distance from the feeding opening 20 below the horizontal plane 7'.

Figure 4A:
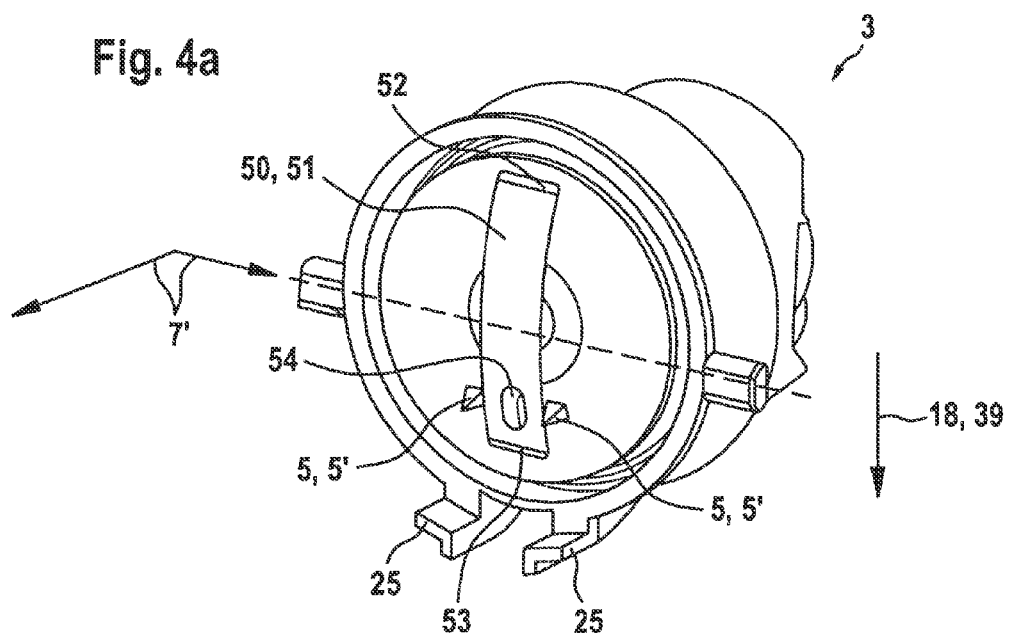
FIGS. 4a to 4d show schematic views of a first brewing chamber element of a brewing apparatus according to a fourth embodiment of the present invention.
Figure 4B:
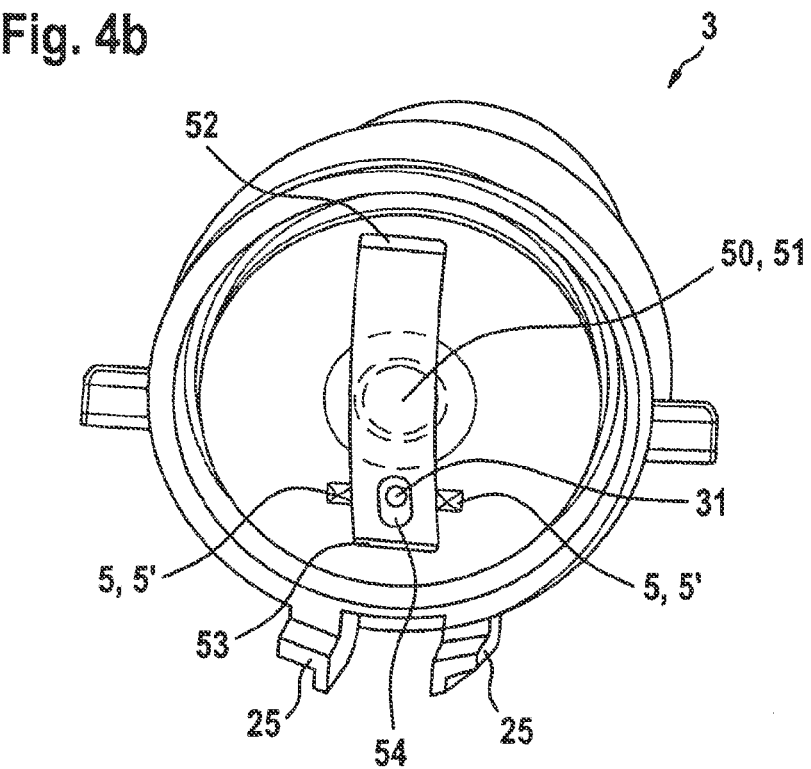
Figure 4C:
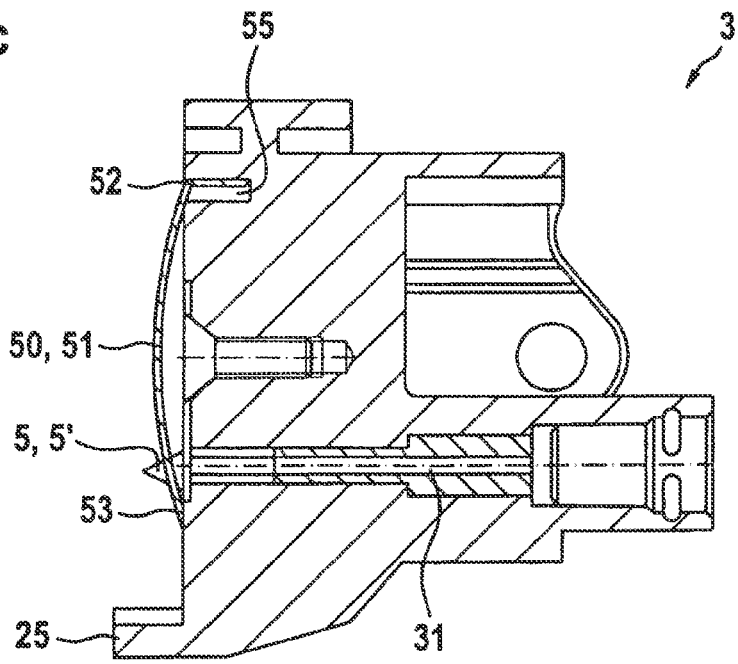
Figure 4D:
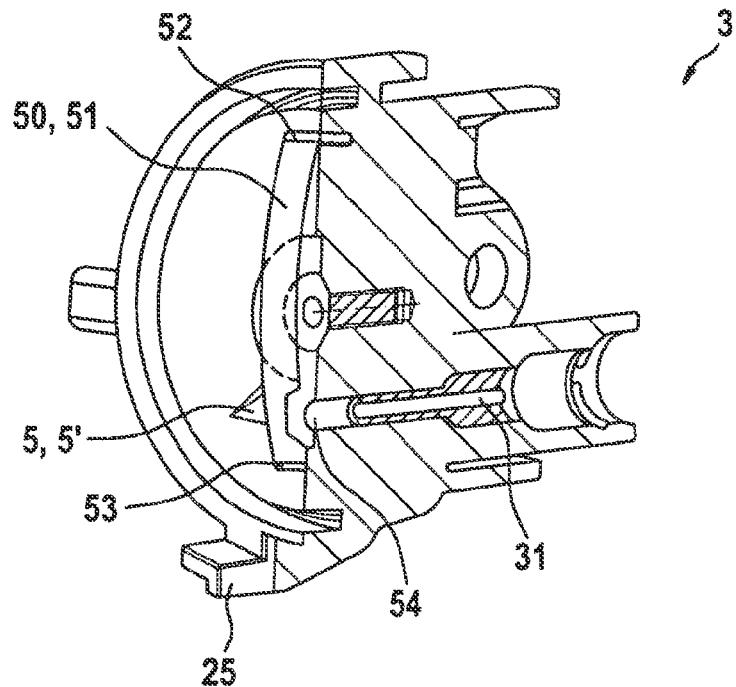

FIGS. 4a to 4d illustrate schematic views of a first brewing chamber element 3 of a brewing apparatus 1 according to a fourth embodiment of the present invention, wherein the brewing apparatus 1 according to the fourth embodiment is substantially equivalent to the brewing apparatus 1, which is illustrated in FIGS. 2a to 2c, according to the second embodiment, wherein, in contrast to the second embodiment, the brewing apparatus 1 merely has two first perforation means 5 which are both arranged below the horizontal plane 7' in the gravitational field 39. A spacing element 50 is arranged between the perforation points 5'. The spacing element 50 comprises a metal strip 51 which extends substantially parallel to the loading direction 18 and is fastened by a first end 52 to the first brewing chamber element 3. For this purpose, as can be seen in FIG. 4c, the first end 52 is angled in the direction of the first brewing chamber element 3 and clamped fixedly in a recess 55 of the first brewing chamber element 3. The second end 53 of the metal strip 51 is a free end not fastened to the first brewing chamber element 3. The metal strip 51 has a curvature between the first and the second ends 52, 53 in the direction of the second brewing chamber element 4. Said curvature serves to space a portion capsule 2, which is inserted between the first and second brewing chamber elements 3, 4 in the loading position 17, from the first brewing chamber element 3 such that the portion capsule 2 does not remain stuck to the two perforation points 5' during the insertion operation. During closing of the brewing chamber, the metal strip 51 is pressed by the portion capsule 2 against the first brewing chamber element 3 such that said metal strip comes into contact with the first brewing chamber element 3 (not illustrated in the figures) in the extraction position 11 and does not impair the extraction operation. In this case, the free, second end 53 moves along the gravitational field 39. Furthermore, the spacing element 50 has a passage hole 54 which is substantially aligned with the water feeding channel 31 of the first brewing chamber element 3 and permits feeding of the extraction liquid to the portion capsule 2.

Figure 5A:
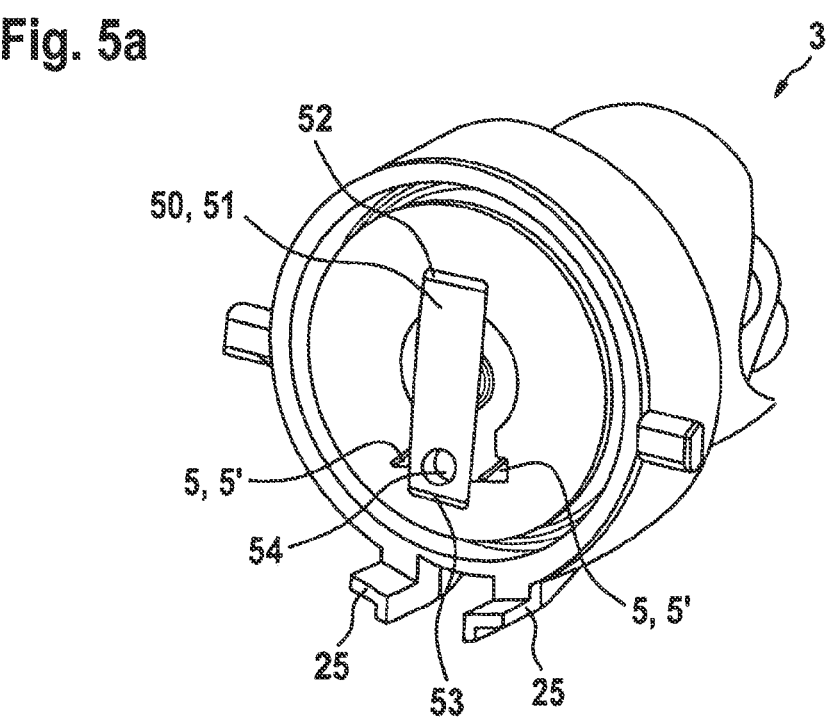
FIGS. 5a to 5c show schematic views of a first brewing chamber element of a brewing apparatus according to a fifth embodiment of the present invention.
Figure 5B:
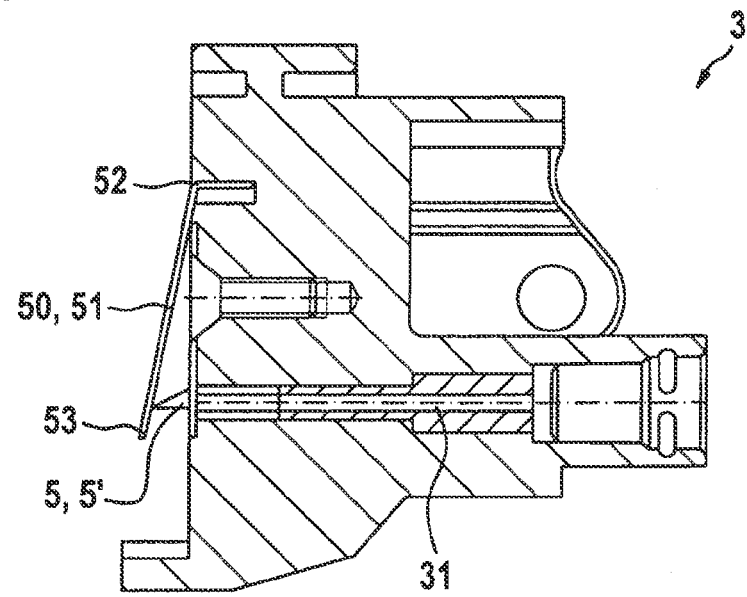
Figure 5C:
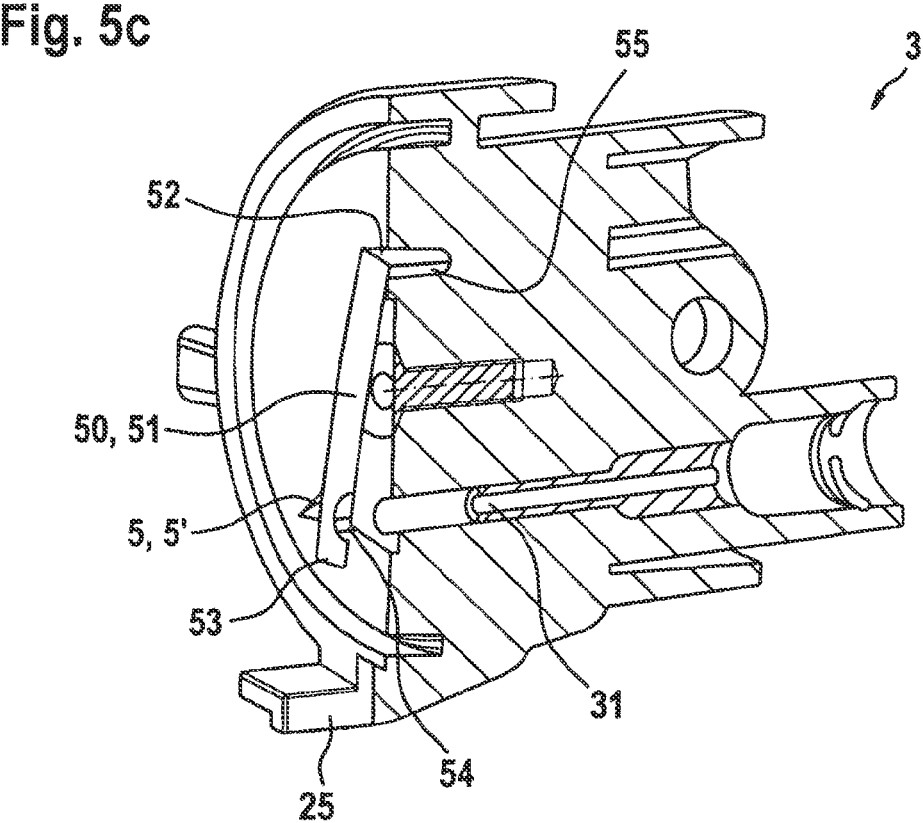

FIGS. 5a to 5c illustrate schematic views of a first brewing chamber element 3 of a brewing apparatus 1 according to a fifth embodiment of the present invention, wherein the brewing apparatus 1 according to the fifth embodiment is substantially equivalent to the brewing apparatus 1, which is illustrated in FIGS. 4a to 4d, according to the fourth embodiment, wherein, in contrast to the fourth embodiment, the brewing apparatus 1 has a spacing element 50 which does not have a curvature but rather, in which, instead, the free, second end 53 protrudes obliquely from the first brewing chamber element 3 in the direction of the second brewing chamber element 4 in the loading position 17. During the transfer of the first brewing chamber element 3 from the loading position 17 into the extraction position 11, the second end 53 is pivoted in the direction of the first brewing chamber element 3 such that the spacing element 50 enters substantially along the entire length thereof into contact with the first brewing chamber element 3 (not illustrated in the figures).

Figure 6:
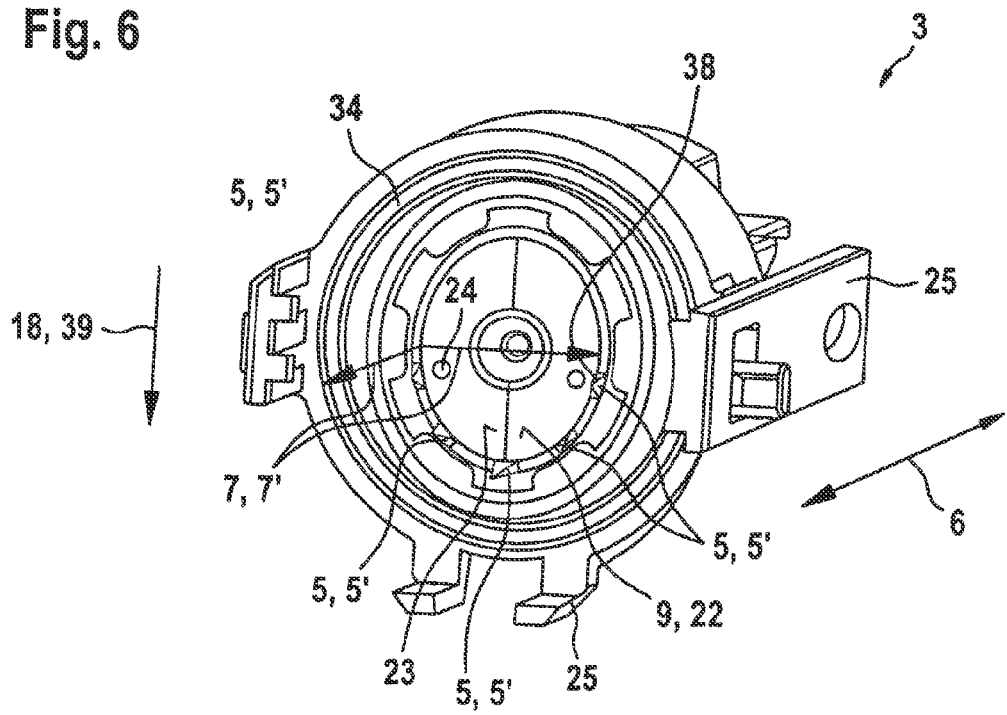
FIG. 6 shows a schematic view of a first brewing chamber element of a brewing apparatus according to a sixth embodiment of the present invention.

FIG. 6 illustrates a schematic view of a first brewing chamber element 3 of a brewing apparatus 1 according to a sixth embodiment of the present invention, wherein the brewing apparatus 1 according to the sixth embodiment is substantially equivalent to the brewing apparatus 1, which is illustrated in FIGS. 1a to 1k, according to the first embodiment and is usable in the brewing apparatus 1 illustrated in FIGS. 1a to 1k, wherein, in contrast to the first embodiment, the first brewing chamber element 3 according to the sixth embodiment has five first perforation means 5 which are arranged below the horizontal plane 7'.

Figure 7:
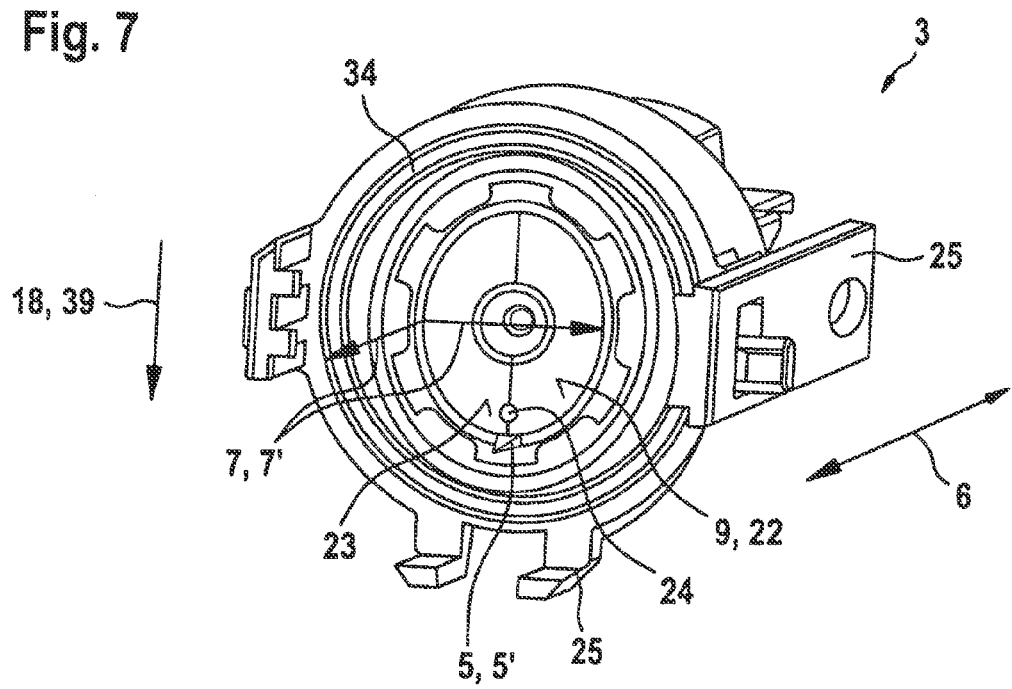
FIG. 7 shows a schematic view of a first brewing chamber element of a brewing apparatus according to a seventh embodiment of the present invention.

FIG. 7 illustrates a schematic view of a first brewing chamber element 3 of a brewing apparatus 1 according to a seventh embodiment of the present invention, wherein the brewing apparatus 1 according to the seventh embodiment is substantially equivalent to the brewing apparatus 1, which is illustrated in FIGS. 1a to 1k, according to the first embodiment and is usable in the brewing apparatus 1 illustrated in FIGS. 1a to 1k, wherein, in contrast to the first embodiment, the first brewing chamber element 3 has only one single first perforation means 5. In this case, said single first perforation means 5 is substantially arranged in a lower edge region of the first brewing chamber element 3 along the gravitational field 39 in order to produce a maximum distance between the feeding opening 20 and the first perforation means 3 and thereby to reduce the risk of injury for a user of the brewing apparatus 1.

FIG. 8 illustrates a schematic view of a first brewing chamber element 3 of a brewing apparatus 1 according to an eighth embodiment of the present invention, wherein the brewing apparatus 1 according to the eighth embodiment is substantially equivalent to the brewing apparatus 1, which is illustrated in FIGS. 1a to 1k, according to the first embodiment and is usable in the brewing apparatus 1 illustrated in FIGS. 1a to 1k, wherein, in contrast to the first embodiment, the first brewing chamber element 3 has a plurality of first perforation means 5 in the form of perforation points 5' (a total of seven first perforation means 5) which are arranged about a central point 201 on the end surface 9 of the first brewing chamber element 3, which end surface faces the second brewing chamber element 4. In this case, the first perforation means 5 are not only arranged below the horizontal plane 7 but instead are arranged with a substantially constant radius in an angular range 202 of approx. 230 degrees about the central point 201.

Possible embodiments of the brewing apparatus according to the invention are described below.

Embodiment 1 relates to a brewing apparatus 1 for extracting a portion capsule 2, comprising a first brewing chamber element 3 and a second brewing chamber element 4, wherein the first and/or the second brewing chamber element 3, 4 are/is movable in an axial direction between a loading position 17, in which the first and the second brewing chamber elements 3, 4 are spaced apart from each other, and an extraction position 11, in which the first and the second brewing chamber elements 3, 4 form a substantially closed brewing chamber 1', characterized in that the first brewing chamber element 3 has at least one first perforation means 5 for perforating the portion capsule 2, which perforation means is arranged along the Earth's gravitational field 39 below a horizontal plane 7' extending substantially at a right angle to the gravitational field 39 and substantially centrally through the brewing chamber 1'.

Embodiment 2 relates to a brewing apparatus 1 according to embodiment 1, characterized in that the first brewing chamber element 3 has a base surface 9 facing the second brewing chamber element 4, wherein the first brewing chamber element 3 has a plurality of first perforation means 5 which are arranged below the horizontal plane 7' with a substantially constant radius about a central point 201 of the base surface 9.

Embodiment 3 relates to a brewing apparatus 1 according to the preamble of embodiment 1 or according to embodiment 2, characterized in that the first brewing chamber element 3 has a plurality of first perforation means 5 for perforating the portion capsule 2, wherein the first perforation means 5 are preferably arranged within an angular range 202 of at maximum 230 degrees about the central point 201.

Embodiment 4 relates to a brewing apparatus 1 as claimed in one of the preceding embodiments, characterized in that the first brewing chamber element 3 comprises at least four first perforation means 5.

Embodiment 5 relates to a brewing apparatus as claimed in embodiment 1, characterized in that the first brewing chamber element 3 has precisely one single first perforation means 5 for perforating the portion capsule 2.

Embodiment 6 relates to a brewing apparatus 1 as claimed in one of the preceding embodiments, characterized in that, in the loading position 17, the portion capsule 2 is fed in a loading direction 18 between the first and the second brewing chamber elements 3, 4, wherein the loading direction 18 is oriented at a right angle to the horizontal plane 7'.

Embodiment 7 relates to a brewing apparatus as claimed in one of the preceding embodiments or as claimed in the preamble of embodiment 1, characterized in that the brewing apparatus 1 is designed in such a manner that, upon movement of the first and/or the second brewing chamber element 3, 4 from the loading position 17 into the extraction position 11, the portion capsule 2 is perforated substantially sequentially by a plurality of first perforation means 5 of the first brewing chamber element 3.

Embodiment 8 relates to a brewing apparatus 1 as claimed in one of the preceding embodiments or as claimed in the preamble of embodiment 1, characterized in that the brewing device 1 is designed in such a manner that, upon movement of the first and/or the second brewing chamber element 3, 4 from the loading position 17 into the extraction position 11, the portion capsule 2 is first of all perforated by the at least one first perforation means 5 of the first brewing chamber element 3 and only then is perforated by at least one second perforation means 8 of the second brewing chamber element 4.

Embodiment 9 relates to a brewing apparatus 1 as claimed in one of the preceding embodiments or as claimed in the preamble of embodiment 1, characterized in that, in the loading position 17, the portion capsule 2 is fed in a loading direction 18 between the first and the second brewing chamber elements 3, 4, wherein the first brewing chamber element 3 has at least one first perforation means 5 for perforating the portion capsule 2, and wherein the cutting plane 19 of the at least one first perforation means 5 is oriented substantially at a right angle to the loading direction 18.

Embodiment 10 relates to a brewing apparatus 1 as claimed in one of the preceding embodiments, characterized in that the at least one first perforation means 5 is designed as a perforation point 5' which protrudes from the first brewing chamber element 3 substantially in the direction of the second brewing chamber element 4.

Embodiment 11 relates to a brewing apparatus 1 as claimed in embodiment 10, characterized in that the at least one perforation point 5' has a substantially linear cross section 36, which is preferably of rectilinear or bent design, in the axial direction 6, and/or in that the at least one perforation point 5' has a substantially triangular profile at a right angle to the axial direction 6.

Embodiment 12 relates to a brewing apparatus as claimed in one of the preceding embodiments, characterized in that the first brewing chamber element 3, on an end side facing the second brewing chamber element 4, has a perforation element 22 which comprises a central surface region 23 which is connected integrally along the circumference thereof to the at least one first perforation means 5.

Embodiment 13 relates to a brewing apparatus as claimed in claim 12, characterized in that the perforation element 22 is produced by bending the at least one first perforation means 5 in relation to the surface region 23 by buckling.

Embodiment 14 relates to a brewing apparatus as claimed in one of the preceding embodiments, characterized in that the first brewing chamber element 3 and in particular the perforation element 22 has a plurality of water outlet openings 24 in the surface region 23 for feeding extraction liquid into the portion capsule 2 perforated by means of the at least one first perforation means 5, wherein, preferably, one water outlet opening 24 is in each case arranged substantially adjacent to the at least one first perforation means 5.

Embodiment 15 relates to a brewing apparatus 1 as claimed in one of the preceding embodiments, characterized in that the second brewing chamber element 4 has at least one second perforation means 8 which is arranged asymmetrically in relation to the plane 7 and in particular in relation to the horizontal plane 7', wherein the second perforation means 8 is preferably arranged below the horizontal plane 7'.

Embodiment 16 relates to a brewing apparatus 1 as claimed in embodiment 15, characterized in that the second perforation means 8 comprises a piercing point 8' which protrudes from the second brewing chamber element 4 substantially in the direction of the first brewing chamber element 3 and is preferably provided with lateral grooves at least over a subregion.

Embodiment 17 relates to a brewing apparatus 1 as claimed in embodiment 16, characterized in that the second perforation means 8 is coupled releasably and in particular via a latching and/or screw fastening to the second brewing chamber element 4.

Embodiment 18 relates to a brewing apparatus 1 as claimed in one of the preceding embodiments, characterized in that the second brewing chamber element 4 comprises a hollow bell-shaped element 14 for receiving the portion capsule 2, wherein a base region 15 of the bell-shaped element 14 comprises at least one depression 16 for conducting away extraction liquid from the portion capsule 2 perforated by means of the second perforation means 8, wherein the second perforation means 8 is preferably arranged in the region of the depression 16, and wherein the depression 16 preferably leads into a drainage channel 13 for removing the extraction liquid from the brewing chamber 1'.

Embodiment 19 relates to a brewing apparatus 1 as claimed in one of the preceding embodiments or as claimed in the preamble of embodiment 1, characterized in that the first brewing chamber element 3 has at least one first perforation means 5 for perforating the portion capsule 2, and in that the brewing apparatus 1 has a spacing element 50 which is designed in such a manner that, when the portion capsule 2 is fed between the first and the second brewing chamber elements 3, 4 in the loading position 17, mechanical contact between the portion capsule 2 and the at least one first perforation means 5 is prevented by the spacing element 50.

Embodiment 20 relates to a brewing apparatus 1 as claimed in embodiment 19, characterized in that the first brewing chamber element 3 comprises two first perforation means 5 in the form of perforation points 5', wherein the spacing element 50 is at least partially arranged between the two perforation points 5', and wherein, in the loading position 17, the spacing element 50 is spaced apart from the first brewing chamber element 3 at least in the region between the two perforation points 5', and wherein the two perforation points 5' are preferably arranged in the gravitational field 39 below the horizontal plane 7'.

Embodiment 21 relates to a brewing apparatus 1 as claimed in either of embodiments 19 and 20, characterized in that the spacing element 50 is fastened to the first brewing chamber element 3 and is at least partially pretensioned elastically in the direction of the second brewing chamber element 4, and/or in that the spacing element 50 is designed in such a manner that, in the extraction position 11, said spacing element bears substantially completely against the first brewing chamber element 3.

Embodiment 22 relates to a brewing apparatus 1 as claimed in one of embodiments 19 to 21, characterized in that the spacing element 50 comprises a metal strip 51, wherein the metal strip 51 has a first end 52 which is fastened to the first brewing chamber element 3 and a second, free end 53, wherein, in the loading position 17, the second end 53 preferably protrudes from the first brewing chamber element 3 obliquely in the direction of the second brewing chamber element 4, or, in the loading position 17, preferably bears against a surface of the first brewing chamber element 3, which surface faces the second brewing chamber element 4.

Embodiment 23 relates to a brewing apparatus 1 as claimed in embodiment 22, characterized in that the metal strip 51 has a curvature in the direction of the second brewing chamber element 4, and/or in that the metal strip 51 has a passage hole 54, and/or in that the metal strip 51 is oriented substantially parallel to the loading direction 18.

Embodiment 24 relates to a method for operating a brewing apparatus 1, in particular as claimed in one of the preceding embodiments, wherein, in a first method step, a portion capsule 2 is inserted between the first and the second brewing chamber elements 3, 4, and wherein, in a subsequent second method step, the first and/or the second brewing chamber element 3, 4 is moved substantially in the axial direction 6 from the loading position 17 into the extraction position 11, characterized in that, during the second method step, the portion capsule 2 is first of all perforated below the horizontal plane 7' by at least one first perforation means 5 of the first brewing chamber element 3 and subsequently the portion capsule 2 is perforated by at least one second perforation means 8 of the second brewing chamber element 4.

Embodiment 25 relates to a method as claimed in embodiment 24 or as claimed in the preamble of embodiment 23, characterized in that, during the second method step, the portion capsule 2 is perforated sequentially by a plurality of first perforation means 5 of the first brewing chamber element 3.

Embodiment 26 relates to a method as claimed in either of embodiments 24 and 25 or as claimed in the preamble of embodiment 24, characterized in that, in the second method step, the portion capsule 2 is perforated by precisely one first perforation means 5.

Embodiment 27 relates to a method as claimed in one of embodiments 24 to 26, characterized in that a capsule cover 28 of the portion capsule 2 is perforated by the at least one first perforation means 5, and in that a capsule base 29 of the portion capsule 2 is perforated by the second perforation means 8.

Embodiment 28 relates to a method as claimed in one of embodiments 24 to 27 or as claimed in the preamble of embodiment 24, characterized in that, in the first method step, the portion capsule 2, while being fed between the first and second brewing chamber elements 3, 4, is at least partially guided by a spacing element 50, which is fastened to the first brewing chamber element 3, in such a manner that mechanical contact between the portion capsule 2 and the at least one first perforation means 5 is prevented by the spacing element 50.

Embodiment 29 relates to a method as claimed in embodiment 28, characterized in that, during the first method step, the spacing element 50 at least partially protrudes from the first brewing chamber element 3 in the direction of the second brewing chamber element 4, wherein, in the second method step, the spacing element 1 is brought into contact with the first brewing chamber element 3.

Embodiment 30 relates to a method as claimed in one of embodiments 24 to 29 or as claimed in the preamble of embodiment 24, characterized in that, in the second method step, the portion capsule 2 is perforated within an angular range 202 of at maximum 230 degrees about the central point 201.

Embodiment 31 relates to a method as claimed in one of embodiments 24 to 30 or as claimed in the preamble of embodiment 24, characterized in that, in a third method step, extraction liquid is introduced into the portion capsule 2 below the horizontal plane 7' and/or within an angular range 202 of at maximum 230 degrees about the central point 201.

Embodiment 32 relates to use of a brewing apparatus 1 as claimed in one of embodiments 1 to 23 for preparing hot beverages, in particular coffee, milk, tea and/or chocolate beverages.

The invention claimed is:

1. A brewing apparatus for extracting a portion capsule, comprising a first brewing chamber element and a second brewing chamber element, wherein the first or the second brewing chamber element is movable in an axial direction between a loading position, in which the first and the second brewing chamber elements are spaced apart from each other, and an extraction position, in which the first and the second brewing chamber elements form a substantially closed brewing chamber,
   wherein in the loading position, the portion capsule is fed in a loading direction between the first and the second brewing chamber elements,
   wherein the loading direction is oriented at a right angle to a horizontal plane,
   wherein the first brewing chamber element has at least one first perforation means for perforating the portion capsule, and in that the brewing apparatus has a spacing element which is designed in such a manner that, when the portion capsule is fed between the first and the second brewing chamber elements in the loading position, mechanical contact between the portion capsule and the at least one first perforation means is prevented by the spacing element,
   wherein the spacing element comprises a metal strip,
   wherein the metal strip has a first end which is fastened to the first brewing chamber element and a second, free end,
   wherein, in the loading position, the second, free end protrudes from the first brewing chamber element obliquely in the direction of the second brewing chamber element, or, in the loading position, bears against a surface of the first brewing chamber element, which surface faces the second brewing chamber element.

2. The brewing apparatus as claimed in claim 1, wherein the metal strip has a curvature in the direction of the second brewing chamber element.

3. The brewing apparatus as claimed in claim 1, wherein the metal strip has a passage hole.

4. The brewing apparatus as claimed in claim 1, wherein the metal strip is oriented substantially parallel to the loading direction.

5. The brewing apparatus as claimed in claim 1, wherein the first brewing chamber element comprises two first perforation means in the form of perforation points, wherein the spacing element is at least partially arranged between the two perforation points, and wherein, in the loading position, the spacing element is spaced apart from the first brewing chamber element at least in the region between the two perforation points, and wherein the two perforation points are arranged in a gravitational field below the horizontal plane.

6. The brewing apparatus as claimed in claim 1, wherein the spacing element is fastened to the first brewing chamber element and is at least partially pretensioned elastically in the direction of the second brewing chamber element.

7. The brewing apparatus as claimed in claim 1, wherein the spacing element is designed in such a manner that, in the extraction position, said spacing element bears substantially completely against the first brewing chamber element.

8. A method for operating, a brewing apparatus comprising, in a first method step, inserting a portion capsule between a first and a second brewing chamber elements, and in a subsequent second method step, moving the first or the second brewing chamber element substantially in the axial direction from a loading position into an extraction position,
   wherein, in the first method step, the portion capsule, while being fed between the first and second brewing chamber elements, is at least partially guided by a spacing element comprising a metal strip, which is fastened to the first brewing chamber element with a first end, in such a manner that mechanical contact between the portion capsule and at least one first perforation means is prevented by the spacing element,
   wherein, during the first method step, the spacing element at least partially protrudes from the first brewing chamber element in a direction of the second brewing chamber element, and
   wherein, in the second method step, a second end of the spacing element is brought into contact with the first brewing chamber element.

\* \* \* \* \*